(12) United States Patent
Touchton et al.

(10) Patent No.: US 9,301,502 B2
(45) Date of Patent: Apr. 5, 2016

(54) TIME OF FLIGHT ANIMAL MONITORING

(71) Applicants: Scott F. Touchton, Pottstown, PA (US); James T. Deery, Spring City, PA (US)

(72) Inventors: Scott F. Touchton, Pottstown, PA (US); James T. Deery, Spring City, PA (US)

(73) Assignee: PERIMETER TECHNOLOGIES, INC., Reading, PA (US)

( * ) Notice: Subject to any disclaimer, the term of this patent is extended or adjusted under 35 U.S.C. 154(b) by 63 days.

(21) Appl. No.: 14/193,636

(22) Filed: Feb. 28, 2014

(65) Prior Publication Data

US 2014/0174376 A1 Jun. 26, 2014

Related U.S. Application Data

(63) Continuation of application No. 12/697,786, filed on Feb. 1, 2010, now Pat. No. 8,692,676.

(51) Int. Cl.
| | |
|---|---|
| *G08B 23/00* | (2006.01) |
| *A01K 15/02* | (2006.01) |
| *A01K 15/04* | (2006.01) |
| *A01K 27/00* | (2006.01) |
| *A01K 29/00* | (2006.01) |

(52) U.S. Cl.
CPC .............. *A01K 15/023* (2013.01); *A01K 15/04* (2013.01); *A01K 27/009* (2013.01); *A01K 29/005* (2013.01); *G08B 23/00* (2013.01)

(58) Field of Classification Search
CPC ..................................................... G08B 23/00
USPC .................. 340/539.1–539.17, 573.1, 573.3; 119/712, 721, 719
See application file for complete search history.

(56) References Cited

U.S. PATENT DOCUMENTS

| | | | |
|---|---|---|---|
| 4,898,120 | A | 2/1990 | Brose |
| 5,067,441 | A | 11/1991 | Weinstein |
| 5,241,923 | A | 9/1993 | Janning |
| 5,337,041 | A | 8/1994 | Friedman |
| 5,381,129 | A | 1/1995 | Boardman |
| 5,425,330 | A | 6/1995 | Touchton et al. |
| 5,460,124 | A | 10/1995 | Grimsley et al. |
| 5,661,490 | A | 8/1997 | McEwan |
| 5,682,839 | A | 11/1997 | Grimsley et al. |
| 5,844,489 | A | 12/1998 | Yarnall, Jr. et al. |
| 5,852,403 | A | 12/1998 | Boardman |
| 5,900,818 | A | 5/1999 | Lemnell |
| 6,019,066 | A | 2/2000 | Taylor |
| 6,163,261 | A | 12/2000 | Westrick |
| 6,269,776 | B1 | 8/2001 | Grimsley et al. |

(Continued)

OTHER PUBLICATIONS

Rainer Hach, Nanotron Technologies GmbH, "Chrip Spread Spectrum: The Latest Advances," presented at Wireless Congress 2007.

(Continued)

*Primary Examiner* — Eric Blount
(74) *Attorney, Agent, or Firm* — Dann, Dorfman, Herrell and Skillman, P.C.

(57) ABSTRACT

A system and method are provided for monitoring the movement of an animal. An animal transceiver unit is placed on the animal for transmitting and receiving signals. A base transceiver unit for transmitting and receiving signals relative to the animal transceiver unit is operated to monitor relative movement of the animal transceiver unit and the base transceiver unit. An indication of the relative distance between the base transceiver unit and the animal transceiver unit is provided in response to signal communication between the animal and base transceiver units.

19 Claims, 25 Drawing Sheets

(56) References Cited

U.S. PATENT DOCUMENTS

| | | | |
|---|---|---|---|
| 6,575,120 | B1 | 6/2003 | Stapelfeld et al. |
| 6,598,563 | B2 | 7/2003 | Kim et al. |
| 6,825,768 | B2 | 11/2004 | Stapelfeld et al. |
| 6,860,240 | B2 | 3/2005 | Kim et al. |
| 6,874,447 | B1 * | 4/2005 | Kobett ............... 119/712 |
| 6,889,135 | B2 | 5/2005 | Curatolo et al. |
| 7,050,906 | B2 | 5/2006 | Hathiram et al. |
| 7,148,801 | B2 * | 12/2006 | Crabtree et al. ......... 340/539.13 |
| 7,375,638 | B2 | 5/2008 | Light et al. |
| 7,512,113 | B2 | 3/2009 | Luaces |
| 7,705,736 | B1 | 4/2010 | Kedziora |
| 7,709,136 | B2 | 5/2010 | Touchton et al. |
| 7,783,451 | B2 | 8/2010 | Wilcox et al. |
| 7,937,042 | B2 * | 5/2011 | Light et al. ............. 455/67.11 |
| 8,312,845 | B2 | 11/2012 | Giunta |
| 2002/0190861 | A1 | 12/2002 | Wentworth |
| 2003/0218539 | A1 | 11/2003 | Hight |
| 2004/0046658 | A1 | 3/2004 | Turner et al. |
| 2005/0057359 | A1 * | 3/2005 | Coffey et al. ............ 340/539.21 |
| 2006/0172697 | A1 | 8/2006 | Gallego et al. |
| 2006/0176178 | A1 * | 8/2006 | Everest et al. ............ 340/572.1 |
| 2008/0252527 | A1 | 10/2008 | Garcia |
| 2009/0315706 | A1 | 12/2009 | Scalisi et al. |
| 2010/0164712 | A1 | 7/2010 | Corrigan |
| 2010/0283602 | A1 | 11/2010 | Tsai et al. |
| 2011/0298619 | A1 * | 12/2011 | O'Hare et al. ............ 340/573.1 |

OTHER PUBLICATIONS

Nanotron Technologies GmbH, "nanoLOC Development Kit Quick Start Guide," pp. 1-24, Oct. 1, 2008.

Schlichting, Dr. Frank, Nanotron Technologies Gmbh, "Wireless Technologies 9th Kongress 2007," pp. 1-52, Sep. 2007.

ISO/IEC, International Standard, Information Technology—Real-Time Locating Systems (RTLS), Part 2: 2,4 GHz Air Interface Protocol, pp. 1-31, Dec. 15, 2006.

Nanotron Technologies GmbH Series of web pages and documents from said web pages containing product information on Nanotron line of RF chips. Dated Dec. 13, 2006.

* cited by examiner

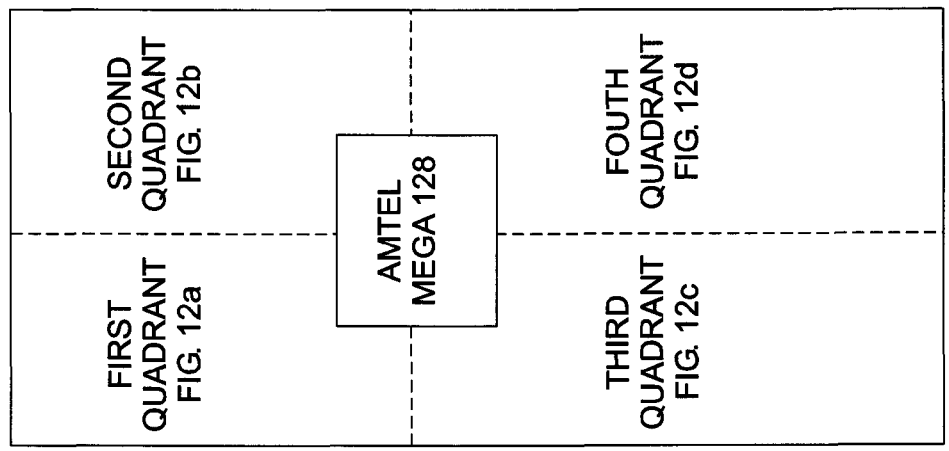
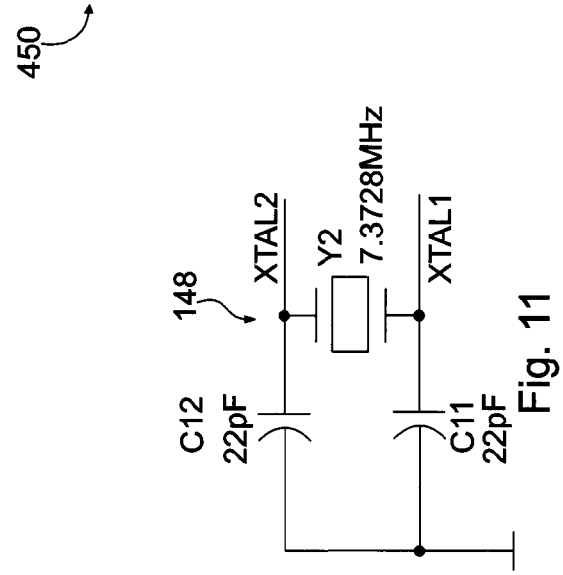
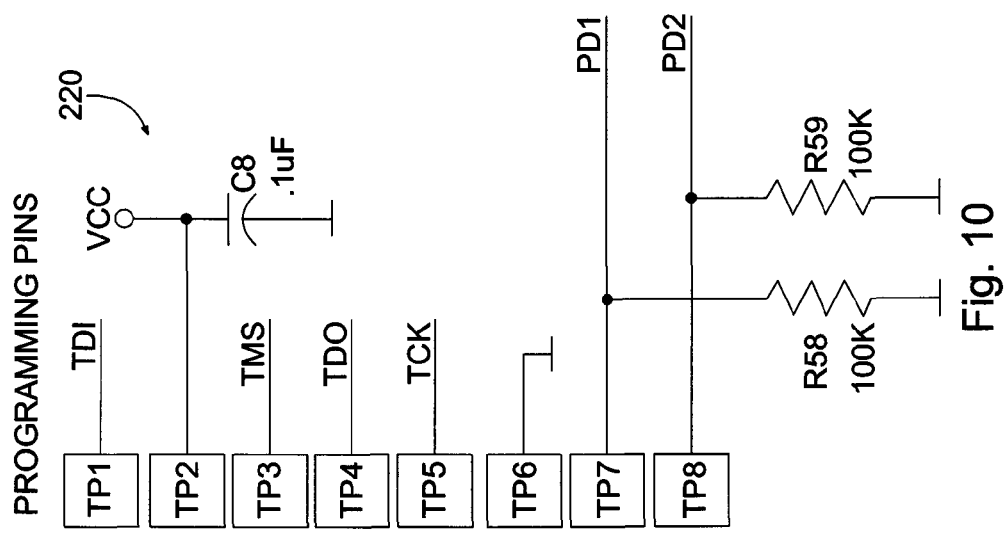

TIME OF FLIGHT ANIMAL MONITORING

CROSS-REFERENCE TO RELATED APPLICATIONS

This application is a continuation of U.S. application Ser. No. 12/697,786, filed Feb. 1, 2010, the entire contents of which is incorporated herein by reference

FIELD OF THE INVENTION

The present invention relates generally to a system and method for monitoring movement of an animal and more particularly, but not exclusively to, a system and method for monitoring movement of an animal, such as a pet, to control or confine the animal within a selected distance from a wireless monitoring unit.

BACKGROUND OF THE INVENTION

Keeping an animal safely within the confines of one's property or within a selected area or range is very important. Unfortunately, giving an animal room to move unsupervised requires barriers be constructed. Physical barriers such as fences or walls are often expensive, time-consuming to create, or unsightly. Common electronic animal control methods utilize a long buried antenna wire that acts as a proximity detection system and border. When the animal's collar is located in proximity to the buried antenna wire, a collar is activated to encourage the animal to retreat from the wire. These conventional systems often require an involved process of arranging and burying a lengthy antenna wire around the area where an animal is to be confined. Once the antenna wire is installed, it becomes for all practical purposes immobile and not easily adjustable to a different position or location.

It would be desirable, therefore, to provide an animal control system that monitors or controls the movement of an animal but is otherwise adjustable or portable. It would also be desirable to provide a system that can determine the distance between the animal and a base.

SUMMARY OF THE INVENTION

In accordance with the present invention, a system and method for monitoring the movement of an animal are provided. In a specific application, a method and system are provided for monitoring the movement of an animal to determine a distance that the animal is located away from a base location that may either be stationary or moveable. In an optional application, a system and method may be utilized for restricting the movement of an animal by applying a stimulus to the animal when the animal has moved to a control or threshold distance away from the base station.

In a specific embodiment, an animal monitoring system may be provided which includes an animal transceiver unit for placement on an animal to be monitored. The animal transceiver unit may include transceiver circuitry for transmitting and receiving signals, for example, RF signals. The animal monitoring system may also include a base transceiver unit, that may optionally be portable or stationary, for operation to monitor relative movement or distance of the animal transceiver unit. The base transceiver unit may include base transceiver circuitry for transmitting and receiving signals, for example, RF signals, relative to the animal transceiver unit. At least one of the animal transceiver unit and the base transceiver unit may be configured to determine and/or provide an indicia of relative distance between the animal transceiver unit and the base transceiver unit in response to signal communication between the animal transceiver unit and the base transceiver unit optionally to monitor relative movement between the base transceiver unit and the animal transceiver unit.

Optionally, the base transceiver unit may include a base controller circuit for controlling operation of the base transceiver unit. Likewise, the animal transceiver unit may optionally include an animal unit controller circuit for controlling operation of the animal transceiver unit. Additionally, at least one of the controller circuits may optionally operate to provide a reference control distance, for example, a boundary limit for the animal, and wherein at least one of the controller circuits may further operate to compare the relative distance between the animal transceiver unit and the base transceiver unit with the reference control distance to produce an output control signal when the comparison meets a criteria for control, for example, when the animal reaches a boundary limit distance. In a particular embodiment, the controller circuit that operates to compare the relative distance with the reference control distance may be the animal unit controller circuit.

The animal transceiver unit of the system may optionally include animal stimulus circuitry for providing a stimulus to the animal in response to the output control signal. For example, the animal stimulus circuitry may include shock generation circuitry for applying a shock to the animal in response to the output control signal. Additionally, the shock generation circuitry may be adjustable to produce selected levels of shock to the animal. Optionally, as an alternative to, or in addition to the shock generation circuitry, the animal stimulus circuitry may include an audible signal generator for producing an audible signal to the animal in response to the output control signal.

The animal transceiver unit of the monitoring system may also optionally include a motion detector for detecting movement of the animal in order to power on or up selected circuitry of the animal transceiver unit to enable transmission and reception of signals relative to the base transceiver unit. Optionally, the motion detector may also function to detect lack of movement of the animal to power down or off selected circuitry of the animal transceiver unit.

The base transceiver unit of the system may also optionally include a user input to enable a user to input information to the base transceiver unit which may be optionally under the control of the base controller circuit. For example, the base controller circuit may function to enable the reference control distance to be input to the base transceiver unit at the user input. In response, the base controller circuit may provide the reference control distance that is input at the user input for comparison with the relative distance to produce an output control signal when the comparison meets a criteria for control, for example, when the relative distance equals or exceeds the reference control distance.

The base transceiver unit of the system may optionally include an output for providing output information to a user. For example, the output may provide output information reflecting the indicia of the relative distance between the base transceiver unit and the animal transceiver unit to the user. For example, the output may include a display, such as an LCD or LED display, for providing a visual display of output information to the user and may function therefore to provide a visual display of the indicia of the relative distance to the user. The output may, as an alternative to, or in addition to the display, include an audible output for providing an audible indication when the indicia of the relative distance meets a selected criteria or as an alarm for the occurrence of some other event such as a low battery signal from the animal transceiver unit.

The animal monitoring system may also be configured so that at least one of the animal transceiver unit and the base transceiver unit is configured to provide the indicia of the relative distance between the base transceiver unit and the animal transceiver unit in real time and at least during relative movement of either one of the transceiver units relative to the other transceiver unit.

In another embodiment of the invention, a system for restricting the movement of an animal may be provided having a base unit comprising a transceiver for broadcasting a wireless signal. An animal unit for placement on an animal may be provided having a transceiver for receiving the wireless signal from the base unit and having a stimulus generator for providing a stimulus to the animal. The animal unit may function to interpret the signal received from the base unit to determine the distance between the animal unit and the base unit. The animal unit may also function to signal the stimulus generator to apply a stimulus to the animal when the distance between the animal unit and the base unit reaches a threshold.

In accordance with the present invention, a method for monitoring a animal is also provided. The method may include the steps of placing an animal transceiver unit for transmitting and receiving signals on an animal to be monitored and placing a base transceiver unit for transmitting and receiving signals relative to the animal transceiver unit at a location for monitoring movement or distance between the base transceiver unit and the animal transceiver unit. The method also includes providing signal communications between the animal transceiver unit and the base transceiver unit and determining relative distance between the base transceiver unit and the animal transceiver unit in response to the signal communications between the animal transceiver unit and the base transceiver unit optionally to monitor the relative movement between the base transceiver unit and the animal transceiver unit.

The method may also include an optional step of providing an output reflecting the relative distance between the base transceiver unit and the animal transceiver unit. The method may also include the step of producing an audible output, for example, at the base transceiver unit, in response to the output to provide an audible indication when the relative distance meets a selected criteria or in response to some other criteria such as a low battery on the animal transceiver unit. Optionally, the method may also include the step of providing an indication of relative distance in real time and at least during relative movement of either one of the transceiver units relative to the other transceiver unit.

The method of monitoring the movement of an animal may also include the steps of providing a reference control distance for the animal and comparing the relative distance between the animal transceiver unit and the base transceiver unit with the reference control distance. Optionally, a control output may be produced when the comparison meets a criteria for control. A stimulus may be applied to the animal in response to the control output. For example, the step of providing a stimulus to the animal may include providing a shock to the animal in response to the control output and/or producing an audible signal to the animal in response to the control output. Optionally, the step of applying a shock to the animal may include adjusting the level of shock so that a selected level of shock may be applied to the animal in response to the control output. The method may also include the step of inputting a selected reference control distance to the base transceiver unit to enable the reference control distance that is input to be compared to the relative distance to produce the control output.

Optionally, the method may include detecting movement of the animal to enable the animal transceiver unit to transmit and receive signals relative to the base transceiver unit in response to movement of the animal.

The method may also include an optional step of moving the base transceiver unit in a direction relative to the animal control unit until the relative distance decreases. Optionally, the method may include the step of locating a lost animal by moving the base transceiver unit relative to the animal transceiver unit until the relative distance decreases sufficiently until the base transceiver unit is moved to a proximity where an animal unit can be located.

BRIEF DESCRIPTION OF THE DRAWINGS

The foregoing summary and the following detailed description of the preferred embodiments of the present invention will be best understood when read in conjunction with the appended drawings, in which:

FIG. 10 is a circuit diagram for an embodiment of optional programming circuitry for the animal transceiver unit of FIG. 1.

FIG. 11 is a circuit diagram of an embodiment of the oscillator circuitry or clock used in the controller circuitry shown in FIG. 6 for the animal transceiver unit of FIG. 1.

FIG. 12 is a block circuit diagram of an embodiment of the controller circuitry for the base transceiver unit of FIGS. 1 and 2.

DETAILED DESCRIPTION OF THE INVENTION

Figure 1:
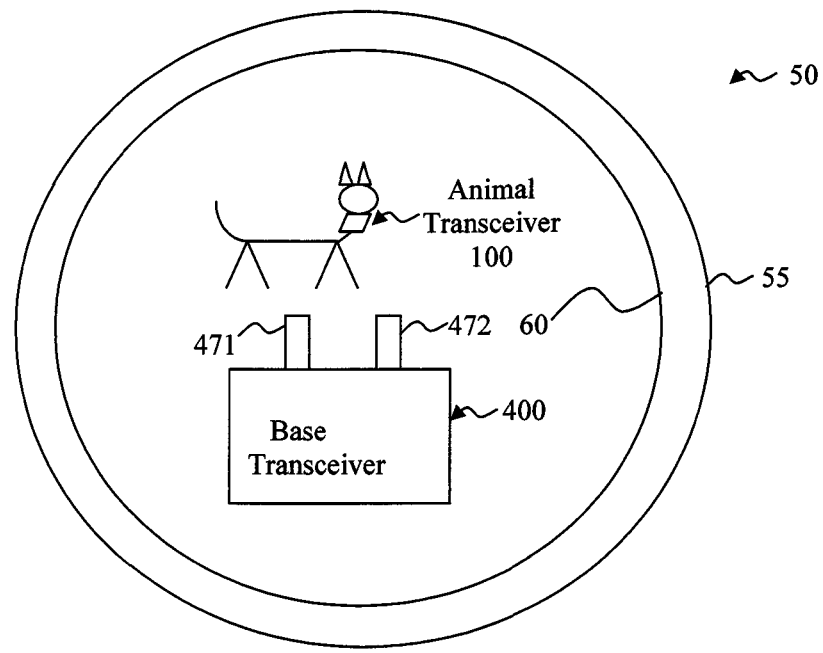
FIG. 1 is a schematic representation of an animal monitoring system in accordance with the present invention utilizing a base transceiver unit and an animal transceiver unit.

Referring to the Figures, an animal monitoring system, generally designated 50, is provided for detecting and monitoring the movement of an animal, such as a dog, within a distance or area of monitoring. More specifically, referring to FIG. 1, the animal detection system 50 includes an animal transceiver unit, generally designated 100, that may be mountable upon an animal to be monitored. For example, the animal transceiver unit 100 may be removeably attachable or mountable on an animal collar to provide a collar transceiver unit. The animal detection system 50 functions to monitor the movement of the animal transceiver unit 100 relative to a base transceiver unit 400 through signal communication between the animal transceiver unit 100 and the base transceiver unit 400. Optionally, the signal communication may be in the form of wireless radio frequency signals (RF signals) transmitted and received between the animal and base units. In operation, the system 50 will monitor the animal anywhere within the range limit 55 of the system. However, the system may operate to provide stimulus or control signals, such as a audible alarm (or alarms) or an electrical stimulus such as an electrical shock, to the animal when the animal moves to or within the vicinity of a control boundary 60 which may optionally be adjustably set at a selected distance or area (or at areas or distances) from the base unit 400 anywhere within the range limit 55. When the control boundary 60 is set at or near the range limit boundary 55, the maximum area or distance of control can be obtained, but the trade-off is that the system will lose track of the animal if the animal were to breach the control boundary when set at or near the range limit boundary. Alternatively, if the control boundary 55 is set at a distance short of the limit boundary 60, the area or distance of control is reduced but the system will still monitor the animal if the control boundary or distance is breached as long as the animal remains within the limit boundary. In an arrangement where the animal transceiver unit and the base transceiver unit each broadcast signals to the other, the range limit of communication will obviously be controlled by the broadcast limit of the component, such as the animal transceiver unit, having the weakest broadcast range. The range may also be controlled, limited or set by a regulatory agency such as the Federal Communication Commission. In use, the system 50 will function to monitor relative movement of the animal transceiver unit 100 and the base transceiver until 400 up to the range limit of transmission between the animal unit 100 and the base unit 400.

In the illustrated embodiment, the base transceiver unit 400 functions to communicate with the animal transceiver unit 100 using wireless electronic signals, such as a radio frequency signals, i.e., RF signals, to monitor relative movement between the collar transceiver unit 100 and the base transceiver unit 400 within a range area or distance provided by the communication range limit between the collar transceiver unit 100 and the base receiver unit 400, as shown, for example, by the outer circle 55 in FIG. 1. The outer signal transmission boundary corresponding to the range limit 55 may be set, determined, or provided by the signal strength and transmission characteristics of the collar transceiver unit 100 and the base transceiver unit 400. The range limit 55 is in essence the maximum distance between the animal unit 100 and the base unit 400 at which communication can still be effected. The range limit circle 55 shown in FIG. 1 shows one example of an equidistant range from antenna 471 of the base unit at which communication with the animal unit may still be effected assuming that the base unit is held stationary. Of course, the base unit may be portable and therefore the communication range 55 relative to the base unit can move as the base unit is moved. A control boundary or distance 60 may be set between the collar transceiver unit 100 and the base transceiver unit 400 in order to establish a desired boundary of control for controlling the animal. For practical purposes, the control boundary 60 must be set within the outer transmission limit 55 of the animal and base units 100 and 400. Preferably, however, the control boundary or distance may be adjustable or can be set by the user to enable the user to select different distances or areas of monitoring.

In general operation, signal transmissions between the collar transceiver unit 100 and the base transceiver unit 400 function to monitor movement of the animal to provide relative distance ranging between the collar transceiver unit 100 and the base transceiver unit 400. When the animal transceiver unit 100 moves to within an actuation distance from the control boundary 60, or in other words to a selected distance away from the base unit 400, the animal transceiver unit 100 will function to detect the distance and apply a control stimulus, such as an electrical shock or an audible alarm, to the animal in effort to deter further movement of the animal toward or beyond the control boundary 60. The control stimulus may be applied in different manners. For example, the sound alarm may optionally be applied at one distance while the shock is applied at another distance, such as a further distance, to permit the animal to respond to the audible alarm before receiving a shock signal if the animal is not deterred or controlled by the audible alarm. Alternatively, both the audible stimulus and the shock stimulus may be applied simultaneously or in some other manner. Since the system monitors the distance between the animal unit 100 and the base unit 400, the system can detect if the animal has already moved beyond the control boundary thereby breaching such control boundary and is thereafter returning back within such boundary, i.e., within the control distance from the base unit 400, so that the administration of a shock would not be desirable. An optional feature of the system 50 may be employed to prevent any stimulus to the animal upon return of the animal back into the confined area once the control boundary has been breached or crossed. Another optional feature where the shock may be disabled or halted is when the animal has remained in or at the distance or area of shock for too long. The system can measure either, the number of shocks that have you administered to the animal within a selected time or measure the shock location. In response, the electrical stimulus can be disabled until reset, or temporarily disabled, to prevent further shocks.

The base transceiver unit 400 may preferably be a portable unit that operates under battery power as well as being able to operate under other forms of power input such as wall outlet or some other form of DC or AC power input. In addition, the base transceiver unit 400 may optionally be configured or programmed to monitor additional collar transceiver units at the same time. Since the base unit 400 is portable, movement of the base unit will correspondingly move the control distance or area 60. Moving the control area 60 may be desirable if the confined area needs to be changed or moved, for example, from a back yard to a side yard or from a house to another location such as a park. In yet another mode of operation, the base transceiver unit may also be moved relative to the collar transceiver unit in order to help locate an animal that has breached the limit boundary 55. For example, as the base transceiver unit 400 is moved relative to the collar transceiver unit 100, an output showing the relative change in distance between the collar transceiver unit and the base transceiver unit may be displayed or provided to a user to enable the user within the limit boundary 60 to make adjustments in movement so as to move closer toward the collar transceiver unit 100 until the animal is located. In order to find an animal that has breached the limit boundary 55, the base unit 400 can be moved in random or experimental paths, such as by foot or car, until signal communication is re-established. Then, the base unit can be moved in a direction that decreases the distance away from the animal unit until the animal is located.

Figure 2:
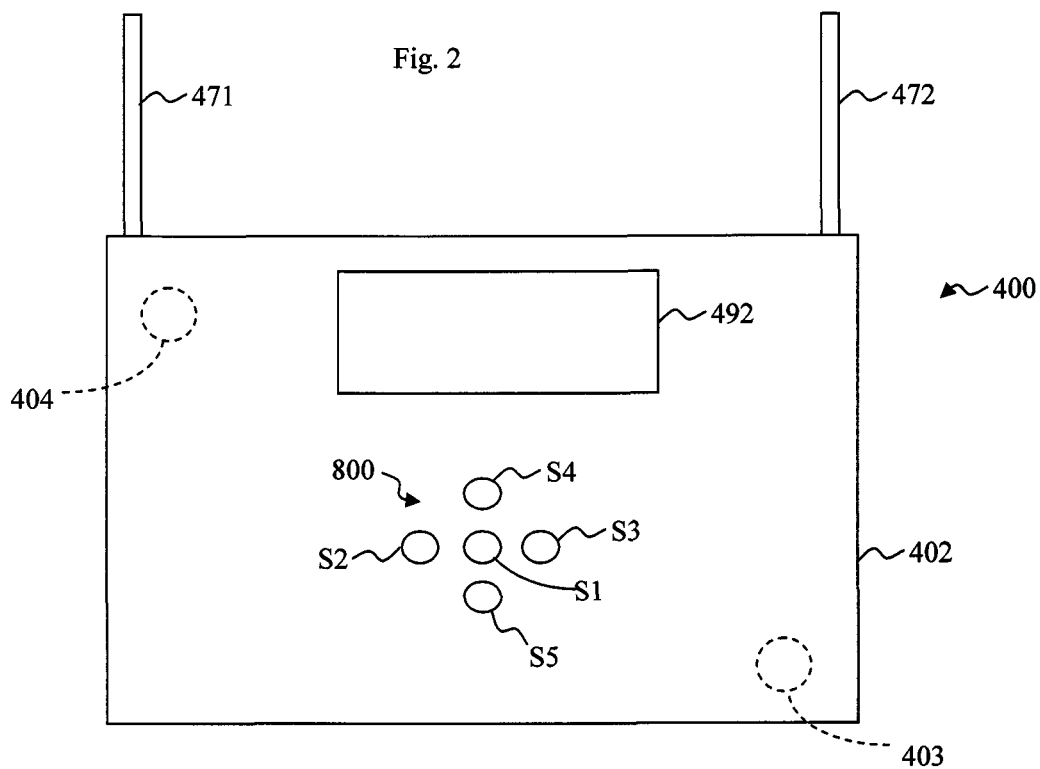
FIG. 2 is a schematic front elevational view of one embodiment of the base transceiver unit that may be utilized in the animal monitoring system depicted in FIG. 1.

Referring to FIG. 2, the base transceiver unit 400 functions to transmit and receive communication signals such as radio frequency signals with the animal transceiver unit 100. In order to provide dedicated monitoring between a base unit 400 and a respective animal unit 100, the animal unit 100 or the base unit 400 may be programmed to monitor each other but not other units. If multiple animal units 100 are to be used simultaneously, the base unit and the multiple animal units may be programmed for dedicated response to identifiable animal units.

The base transceiver unit 400, as shown in FIG. 2, includes a housing 402 which may be in the form of a light weight protective housing to enable the housed circuit elements to be protected while also enabling the unit 400 to be light enough to be easily and portably relocated to different areas such as a yard, a park, or other selected vicinity where an owner may wish to monitor the location of an animal or pet. For this purpose, the base transceiver unit 400 includes an outer housing 402 preferably made of a protective material such as a hard, durable or rigid plastic material. The base receiver unit 400 also includes a user input, generally designated 800, to enable a user to selectively input information to the base transceiver unit 400. The user input 800 may be in the form of a keypad or an arrangement of push buttons S1, S2, S3, S4, S5. The input buttons may be arranged so that a central button S1 may function as a power on and/or power off button as well as an ENTER button to enable a user to enter menu selections to the device. The remaining buttons S2-S4 may be arranged and used to select different menu options or instructions or to increase or decrease various levels, or to provide other input entries to the device. To enable information to be displayed to the user, such as programming information, entry information, input and/or output information, or other user information such as low battery power or reception indicators, an output display 492 may be provided. The output display 492 may be in the form of an LCD or LED display.

As shown in FIGS. 1 and 2, the base transceiver unit 400 may also include an antenna arrangement of one or more antennas 471 and 472 for transmitting and/or receiving communication signals relative to the animal transceiver unit 100. As shown in FIG. 2, the base transceiver unit 400 may include a pair of antennas 471 and 472 that may be positioned apart either physically or electronically at a selected fractional wave length of transmission such as a half wavelength in order to help avoid a null signal or a null in reception or transmission relative to the animal transceiver unit 100. The device 400 may also include a power jack or power port 403, as shown in phantom on the back of the unit, to enable the unit to be plugged into an external source of power such as an AC power source, such as a home outlet, or to external DC source such as a car adapter for connection to the car battery. Preferably, the unit 400 may also include rechargeable batteries that may be recharged through the external power source. The base unit 400 may also include a reset port 404, as shown in phantom on the back of the unit, to enable the unit to be reset, for example, for new or alternative programming instructions to be input. A power switch may also be provided to turn the unit on and/or off. The power switch may be provided as a separate switch or may be programmed to be one of the push buttons such as button S1 for example. The base unit 400 and/or collar unit 100 may be programmed so that the base unit 400 only communicates with specifically dedicated or programmed animal units 100.

Figure 3:
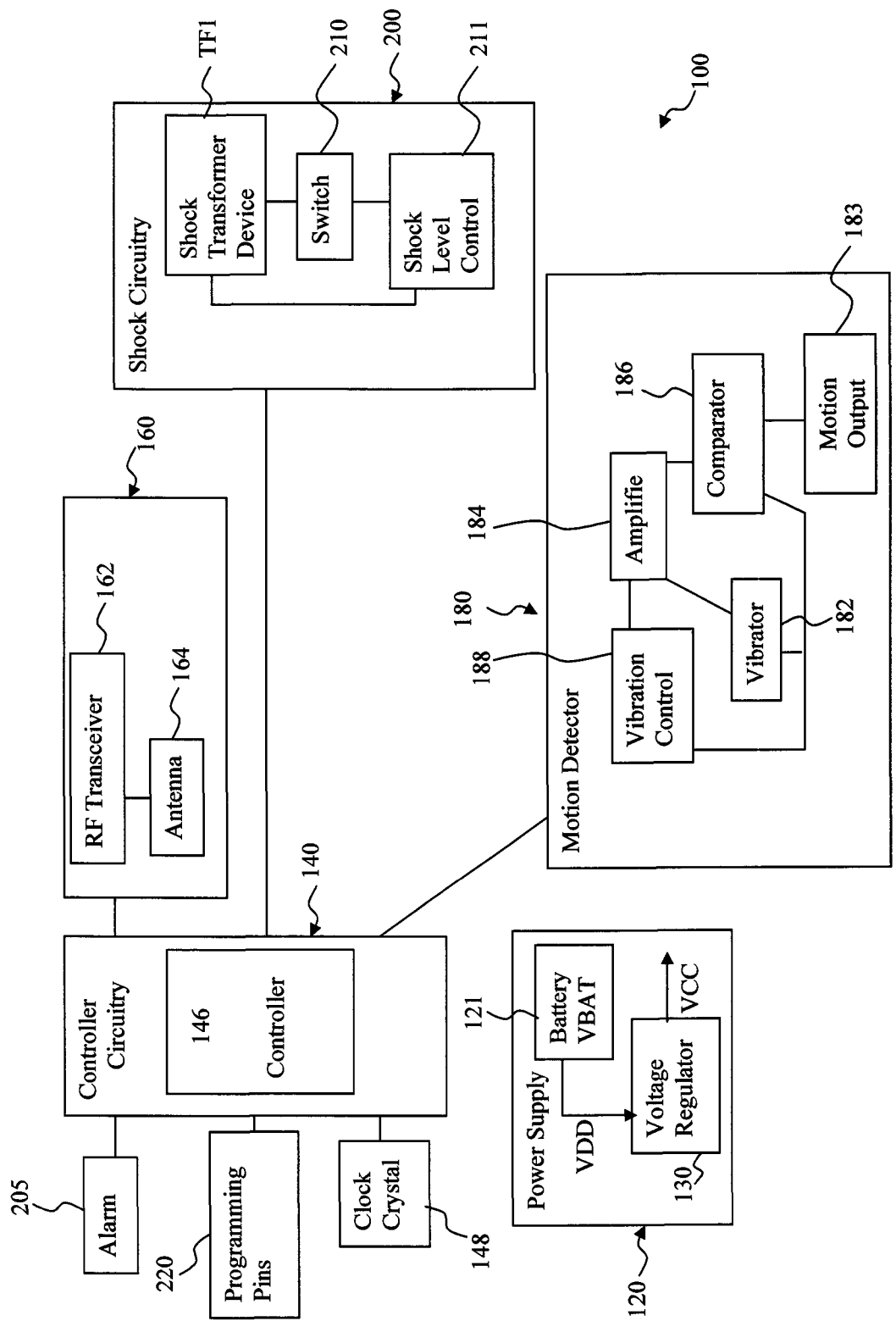
FIG. 3 is a schematic block circuit diagram of an embodiment of the animal transceiver unit that may be utilized in the animal monitoring system depicted in FIG. 1.

The animal transceiver unit 100 is preferably configured to be mountable on an animal such as by removable attachment onto an animal collar as shown in FIG. 1. The animal transceiver unit 100 functions to communicate with the base transceiver unit 400 in order to monitor movement of the animal unit 100 relative to the base transceiver unit 400. For this purpose, as generally shown in FIG. 3, the animal transceiver unit 100 includes controller circuitry 140 that utilizes a controller or processor 146 that functions to control the operation of the animal transceiver unit. The animal transceiver unit 100 includes an internal power supply 120, such as a battery 121, preferably a rechargeable battery, removeably held in a battery receptacle area. The internal power supply 120 may include a battery 121 that is electronically connected or coupled with a voltage regulator 130 to convert the battery voltage VBAT, or a voltage VDD derived from VBAT, to a desired useable output voltage such as voltage VCC for the operation of certain circuitry of the animal receiver unit, such as the controller circuitry 140.

Optionally, as shown in FIG. 3, the animal receiver unit 100 may also include a motion detector, generally designated 180, for detecting motion of the dog. The Motion Detector may also operate at VCC. Upon detection of motion of the dog, the motion detection circuitry 180 may function to awaken the controller 146 from a sleep mode of operation and to power up the necessary or selected circuitry of the collar receiver unit from a reduced power consumption mode of operation. When the motion detector circuitry 180 detects that the dog is no longer moving, or moving below a certain range or degree of motion, the motion detection circuitry 180 may function to cause the controller 146 to go to sleep and to power down unnecessary or selected circuitry, or to slow down operation of selected circuitry, in order to conserve battery power. More specifically, the motion detector circuitry 180 may include a motion sensor 182 in the form of a motion vibrator which functions to produce an electrical signal in response to a selected amount of movement of the vibrator 182 in response to the motion of the animal unit 100 on a dog. The electrical signal produced by the vibrator may be supplied to an amplifier 184 for amplifying the motion detection signal. The amplified motion detection signal provided by the amplifier 184 may then be supplied to a comparator 186 to enable a motion output 183 to produce a motion output signal when the amplified motion detection signal produced at the output of the amplifier 184 exceeds a selected vibration threshold level supplied by vibration control circuitry 188 as the threshold input to the compactor 186. In this regard, the vibration control circuitry 188 can be utilized to set a certain amount or degree of motion before enabling a motion output signal at the output of the comparator 186. In this regard, the vibration control circuitry 188 can be utilized to enable motion detection to be set a level above the motion produced by a normal bark or a single head wag or some other selected criteria of movement so that a motion output signal is not produced. The motion output signal is supplied to the controller 146 to enable the controller to awaken from a sleep mode and to power up selected operating circuitry of the animal transceiver unit 100. The controller 146 may also function to time the motion output signal before powering up or measuring the speed of desired circuitry. If motion is not detected, the motion output signal will change parameter, such as going from High to Low, to indicate to the controller 146 that motion is not being detected. Based on selected criteria, such as lack of motion for a selected time, the processor 146 may go to sleep and power low selected circuitry to conserve power.

In operation, the controller 146 includes a clock in the form of crystal 148 for effecting the timing of the controller 146. In addition, programming pins and circuitry 220 may be connected with the controller 146 in order to provide an input area for providing programming instructions to the controller 146.

In operation, the controller circuitry 140 under control of the controller 146 communicates with signal communication circuitry 160 preferably in the form of a signal transceiver such as an RF signal transceiver 162. The transceiver circuitry 160 may operate at voltage VCC. The transceiver circuitry 160 includes an RF transceiver circuit or chip 162 that functions to transmit and receive RF communication signals relative to the base transceiver unit in order to monitor and control the movement of the animal relative to the base transceiver unit 400. The transceiver chip 162 functions through RF communications with the base unit 400 to calculate a distance between the animal unit 100 and the base unit 400 in real time. The transceiver chip may preferably function to calculate such distance using time of flight transmissions between the animal and the base unit to calculate real time distance, including changing distances, between the animal and base units. In order to transmit and receive the signals, the RF transceiver circuit 162 is connected with an antenna circuit 164 that enables RF signals to be transmitted to and from the animal transceiver unit 100 relative to the base transceiver unit 400.

In order to confine an animal within a desired boundary area or distance, an audible alarm 205 may be provided. The audible alarm 205 is controlled by the controller to produce an audible signal in the form of an audible control stimulus to the animal when the signal transceiver 160 detects that the animal has neared, approached or breached the control boundary 60 set or provided for the animal at a selected distance from the base transceiver unit 400. In addition, an electrical stimulus, such as a shock may also be provided to the animal as a further detriment to approaching, nearing, or breaching the desired control boundary. For this purpose, shock circuitry 200 is provided as an additional animal control stimulus. The shock circuitry 200 operates under the control of the controller 146. The shock circuitry 200 includes a shock transformer device TF1 in the form of a coil for example that includes a secondary coil having electrodes positioned at or in contact with the animal for delivery of a small shock to the animal in response to current flow through the primary coil. In order to provide different levels of shock, a shock level control circuitry 211 may be provided to enable the user to select different shock levels. For example, the shock level control may utilize a series of digital switches, such as switching transistors, to provide a series of discreet shock levels. In order to activate the shock transformer device into a shock activation mode to apply an electric stimulus to the animal, switching circuit 210 is provided that operates under control of the controller 146. The switching circuit may function with the controller to enable a shock stimulus to an animal when the animal nears or reaches the control boundary 60 and a sufficient level of charge has been stored to achieve the desired level of shock. The controller 146 may also be programmed for a fail safe mode to prevent further shocks from being delivered after a time period, such as 10 or 20 seconds, even though the animal remains in the shock vicinity of the control boundary. The shock circuitry 200 and the alarm 205 may operate at VBAT or VDD.

Figure 4:
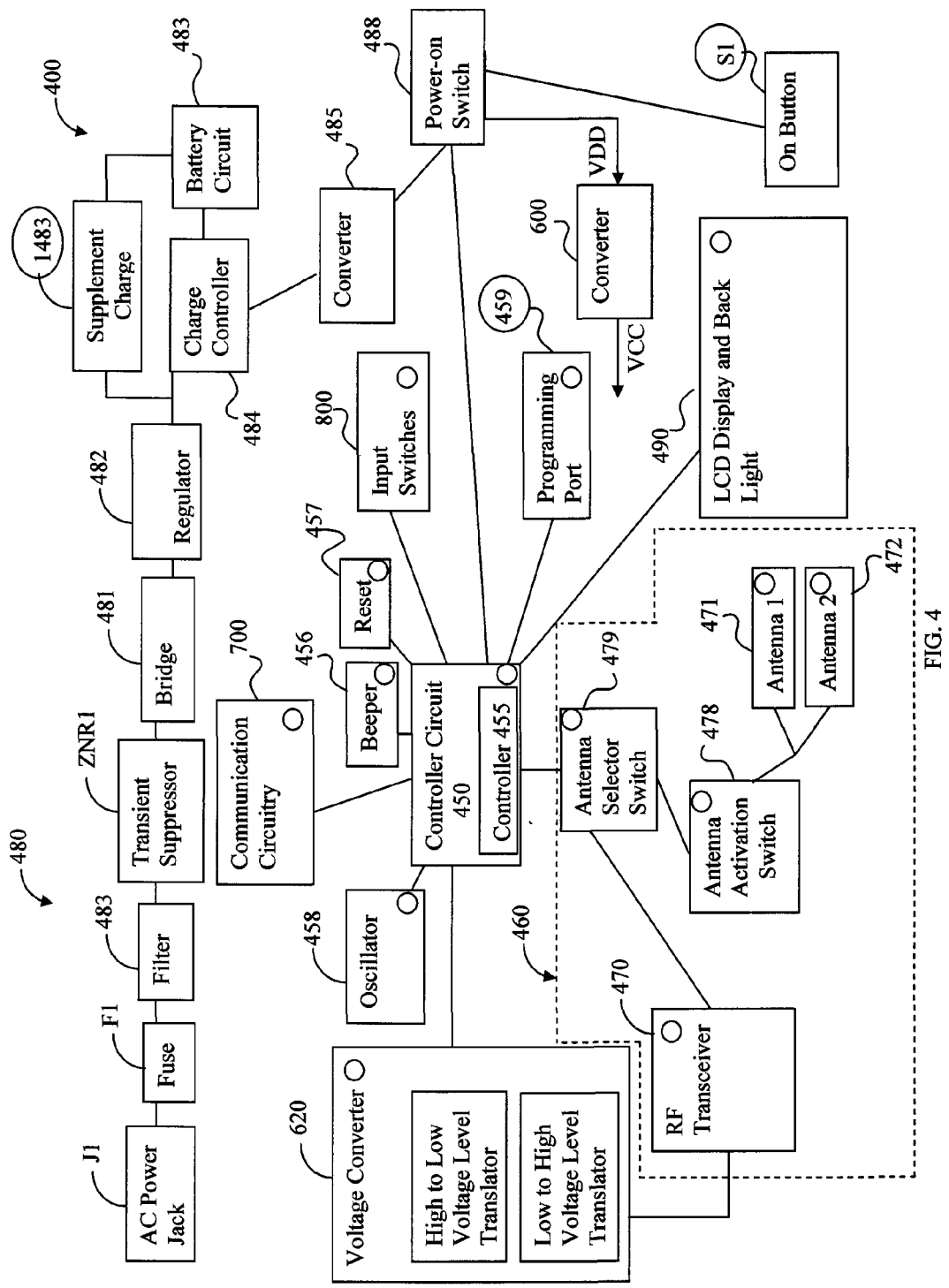
FIG. 4 is a schematic block circuit diagram of an embodiment of the base transceiver unit that may be utilized in the animal monitoring system depicted in FIG. 1.

Referring now to FIG. 4, the base transceiver unit 400, generally schematically shown in block diagram, includes a controller circuitry 450 utilizing a controller 455 for controlling the operation of the base transceiver unit 400. An oscillator or clock 458, which may be provided as a part of the controller circuitry 450, is connected or coupled with the controller 455 to time the controller. A reset 457, which may be provided as a part of the controller circuitry 450, is available to reset operation or programming instructions for the controller 455. In order to provide manual or user input to the controller, input switches 800, for example, in the form of push button switches, are provided to enable the user to depress a selected switch button to provide instruction or input to the controller 455. A programming port 459 is provided to enable programming instructions to be provided to the controller 455. An output display 490 is provided on the base transceiver unit 400 in order to provide a display of information to a user. The output display 490 may be in the form of an LCD display which may further optionally include an LED backlight. An audible output 456 is also provided under the control of the controller 455 to provide audible output signals at the base transceiver unit 400. For this purpose, the audible output 456 may be in the form of a speaker or a beeper to signal at the base unit. For example, the speaker 456 may be enabled by the controller 455 to provide an audible alarm that the animal has moved into the vicinity of or within a selected distance of the control boundary 60 so as to therefore provide an early warning signal to a user monitoring the base unit 400. Alternatively or in addition, the audible output 456 may provide an audible signal at the base unit to reflect that a stimulus, such as a shock or audible alarm, has been administered by the collar unit 100 or that the collar unit has moved into the vicinity of or has breached the control boundary 60. Still further, the base unit 400 may also provide an audible signal reflecting a low or dead battery on the collar unit 100 or an audible signal that no reception signal from the collar unit 100 is being received, for example, if the collar unit 100 has moved into a dead zone within the control boundary 60 or has moved beyond the transmission limit 50. Communication circuitry 700 is also provided to enable external communications. For example, the communication circuitry 700 may be in the form of a RS232 port and associated circuitry or a USB port and associated circuitry or some other external communications jack or port.

In order to effect communications between the base controller unit 400 and the animal transceiver unit 100, the base transceiver unit 400 includes signal communication circuitry, generally designated 460. The signal communication circuitry 460 may include a signal transceiver circuit 470 preferably in the form of an RF transceiver chip which functions to provide RF signal communications via a signal antenna optionally in the form of an antenna pair, antenna 1 and antenna 2, 471 and 472. The RF transceiver 470 functions to process and communicate RF signals relative to the animal unit and may therefore be used to calculate the distance between the animal and base units. The RF transceiver 470 operates with the controller 455 to effect antenna activation switch through antenna activation circuitry 478 as enabled by antenna selection switch 479 under the control of the controller 455. The antenna selection switch may 479 be operated to activate antenna 1 or antenna 2 in response to the respective antenna receiving the strongest or most usable signal from the animal transceiver unit 100. In the event that the controller 455 and the RF transceiver 470 operate at different digital logic levels, a voltage converter 620 may be utilized to convert the voltage signals from the controller to the appropriate signal level used by the RF transceiver and to likewise convert the voltage levels of the signal from the RF transceiver to the appropriate signal levels for the controller. For example, the voltage converter 620 may be utilized to convert a relatively higher digital voltage level of VDD utilized by the controller to a relatively lower digital voltage level VCC utilized by the RF transceiver and to convert a relatively lower digital voltage of VCC utilized by the transceiver to a relatively higher digital voltage level VDD used by the controller.

In order to supply power to the circuitry of the base transceiver unit 400, power supply circuitry, generally designated 480, is provided. In general, a power jack J1 may be provided for connection to an external source of either AC or DC power. In order to prevent damage to the circuitry of the base transceiver unit 400, a fuse F1 is provided. A filter 483 may be provided to filter signals between the power jack and the operating circuitry of the base transceiver unit 400. In this respect, for example, the filter 483 may be in the form a RF noise filter to prevent RF noise from leaking back to the input jack J1. A voltage or power transient suppressor ZNR1 may be provided in the form of a ZENER diode. To enable an AC power source to be connected with the power jack J1, an AC to DC bridge 481 may be provided to convert the AC power supplied at the jack to DC power for use by the circuitry. A voltage regulator or converter 482 is provided to convert the various input voltages that may be supplied to the converter 481 to a useable output voltage. For example, the regulator 482 may be used to convert a voltage input range of about 6 to 35 volts to a desired output voltage of about 5.6 volts. The output of the regulator 482 is supplied directly or indirectly to a charge controller circuit 484 which connects with a battery circuit 483 in order to supply charging power to a rechargeable battery connected at the battery circuit 483. Optionally, the output of the regulator may also be supplied through a supplemental charger circuit 1483 for supplying charging voltage to a supplemental or extra rechargeable battery removeably stored within the unit. The charge controller circuit 484 also functions to permit the rechargeable battery at the battery circuit 483 to be used as a power source for the circuitry of the base transceiver unit 400 in the event that no external power source is connected at power jack J1 or an external power source is disconnected at jack J1 to enable the base unit 400 to become portable. The output from the charge controller circuit 484 may be in the range of 3.6 to 4.2 colts depending on the voltage input. The output from the charge controller circuit 484 is supplied to a converter 485 to provide a uniform output voltage, such as VDD, for use by certain circuitry in the base unit The output from the converter 485 is supplied through a power on switching circuitry 488 which may be under the control of an input switch 800 such as a push button S1. For example, depressing S1 for a selected time may function to switch on power to operate the controller and certain circuitry of the base transceiver unit 400. Optionally, depression of the push button S1 for a more extended time period such as 5 seconds after the unit is already on may function to enable the unit to power off under the control of the controller. The output from the converter 485 is also supplied to a voltage regulator circuit 600 in order to convert the output voltage of the converter 485, such as voltage VDD, to another useable output voltage such as voltage VCC. The converter 600 may optionally be connected to the output of the converter 485 through the power on switching circuitry 488, as shown in FIG. 4. The power on switching circuitry 488 functions when switched or powered on to supply voltages such as VDD and VCC to the operating circuitry. For example, the display circuitry 490 and the controller circuitry 450 may utilize voltage VDD while the transceiver circuitry 470 utilize voltage VDD. Various diagnostic circuitries and monitoring circuitry may also optionally be provided.

Figure 5:
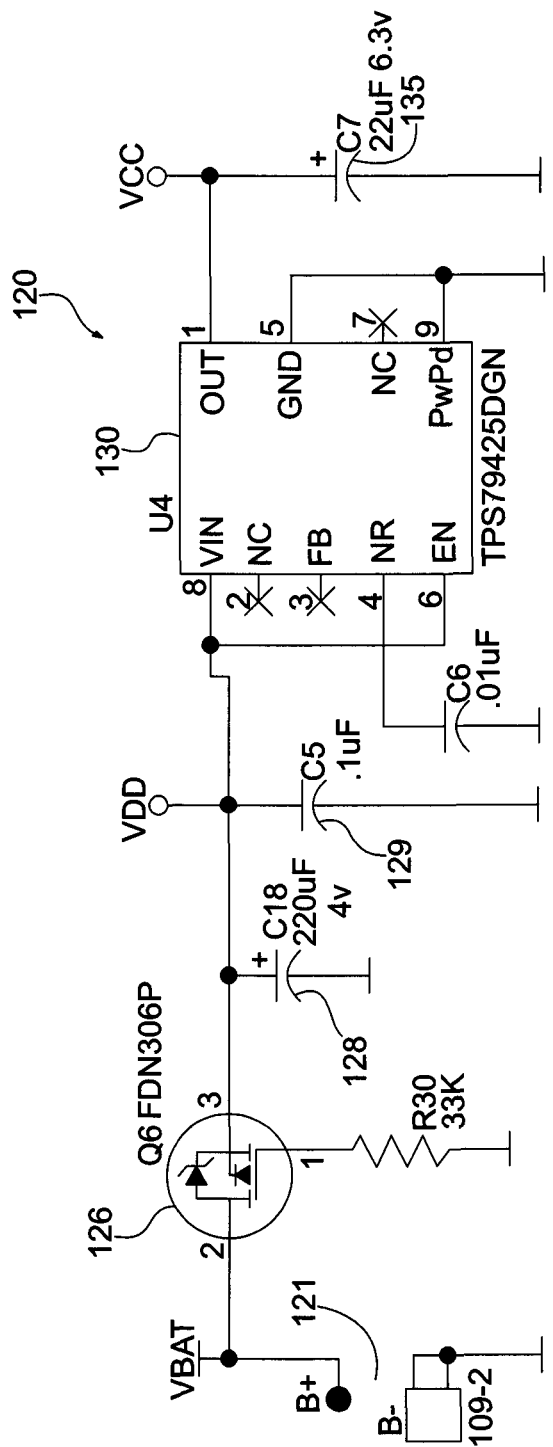
FIG. 5 is a circuit diagram of an embodiment of power supply circuitry for the animal transceiver unit of FIG. 1.

Considering the circuitry of the animal transceiver unit 100 in greater detail as shown in FIGS. 5-11, the collar transceiver unit 100 includes a power supply circuit, generally designated 120, as shown in FIG. 5. The power supply 120 includes a portable power source such as a battery 121, a 3.6 volt VBAT rechargeable battery, to supply power to the circuitry of the collar transceiver unit 100. As shown in FIG. 5, the power supply 120 includes a battery receptacle having contacts for receiving a 3.6 volt battery at the B+ and B− terminals. From the B+ terminal, the battery is connected to an isolation transistor 126 that in the form of transistor Q6 functions to protect against inadvertent insertion of the battery in the reserve direction. If the battery is inserted incorrectly, the transistor 126 will not turn ON thereby preventing an inadvertent connection of the erroneously reversed battery with a voltage regulator 130. The transistor 126 is in turn connected with filters 128 and 129 in the form of large cap and small cap capacitors C18 and C5, respectively. The large cap capacitor 128 functions to filter low frequency disturbances at the battery such as caused by administering an electrical stimulus to the animal, activating the buzzer, or during transmissions by the transceiver circuitry. The small cap capacitor 129 functions to filter against high frequency noise such as caused by the clock for the microprocessor and synthesizers in the transceiver. After the filtering circuitry, a voltage regulator 130 is provided in the form of converter chip U4. The voltage VBAT from the battery produces a voltage VDD at the input of the converter 130. The voltage regulator 130 functions to convert voltage VDD supplied from the battery at the input of the converter for use in certain circuitry of the collar unit to a useable voltage output, VCC, for use in other circuitry of the collar transceiver unit. A battery having an output voltage VBAT of about 3.6 volts provides a useable voltage, VDD, of about 3.2 DC volts at the input of the regulator 130 for use with certain circuit components. The regulator 130 functions to convert the useable input voltage VDD, of about 3.2 volts, to a useable output voltage VCC, of about 2.5 volts, which may be used to power other circuit elements. The voltage regulator 130 also provides an under-voltage lock out to prevent the output of any voltage if the battery voltage dips below 2.6 volts. The voltage output lock functions to protect the battery in the event that the battery voltage dips below a predetermined voltage, such as 2.6 volts. This is a desirable feature particularly if lithium ion batteries are utilized because there is a tendency that such batteries will become ruined if such batteries discharge below a certain level. A filter 135 in the form of capacitor C7 is provided at the output of the voltage regulator 130 in order to stabilize the DC output voltage VCC at approximately 2.5 volts.

Figure 6:
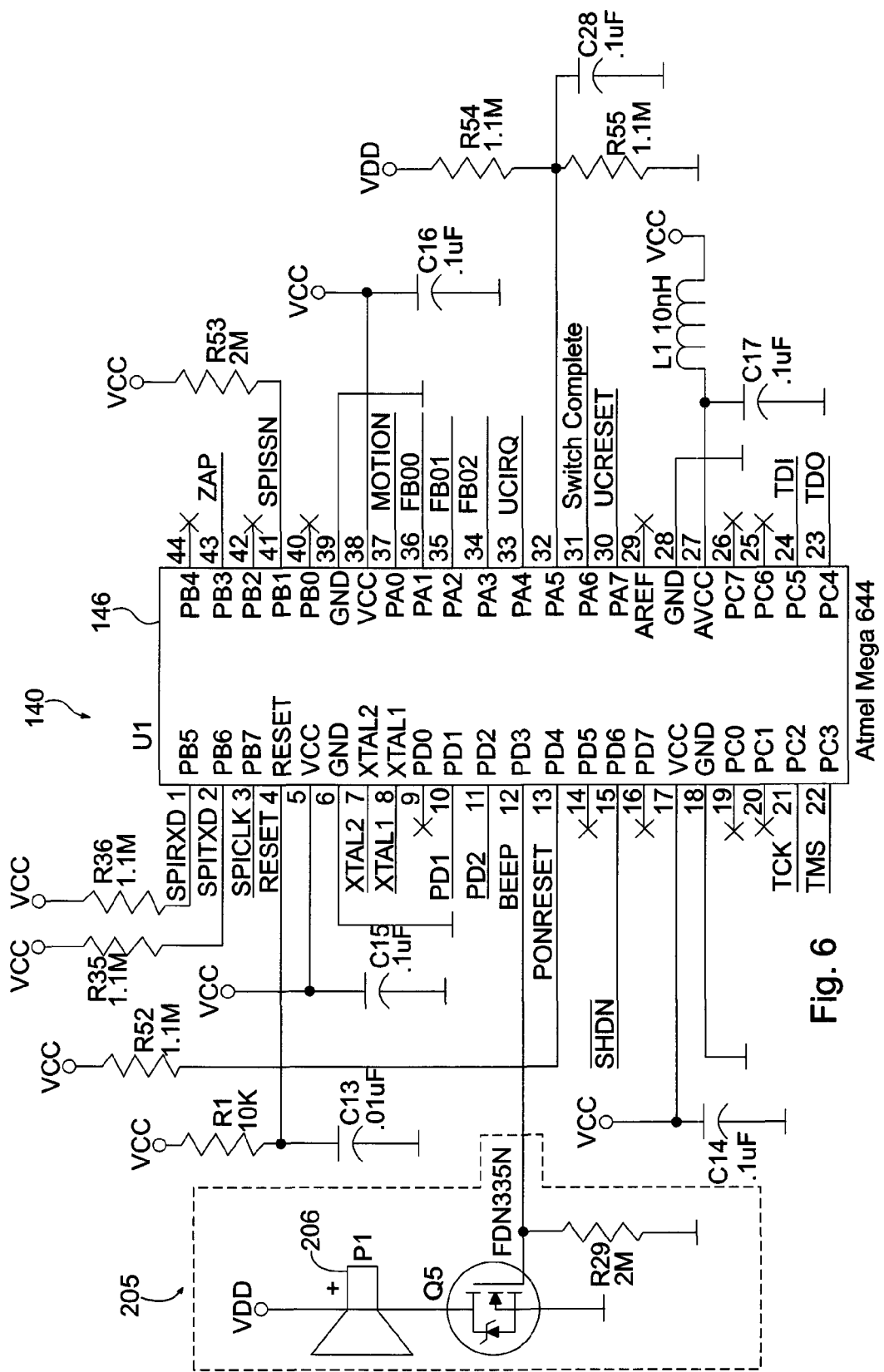
FIG. 6 is a circuit diagram of an embodiment of controller circuitry for the animal transceiver unit of FIG. 1.
Figure 7:
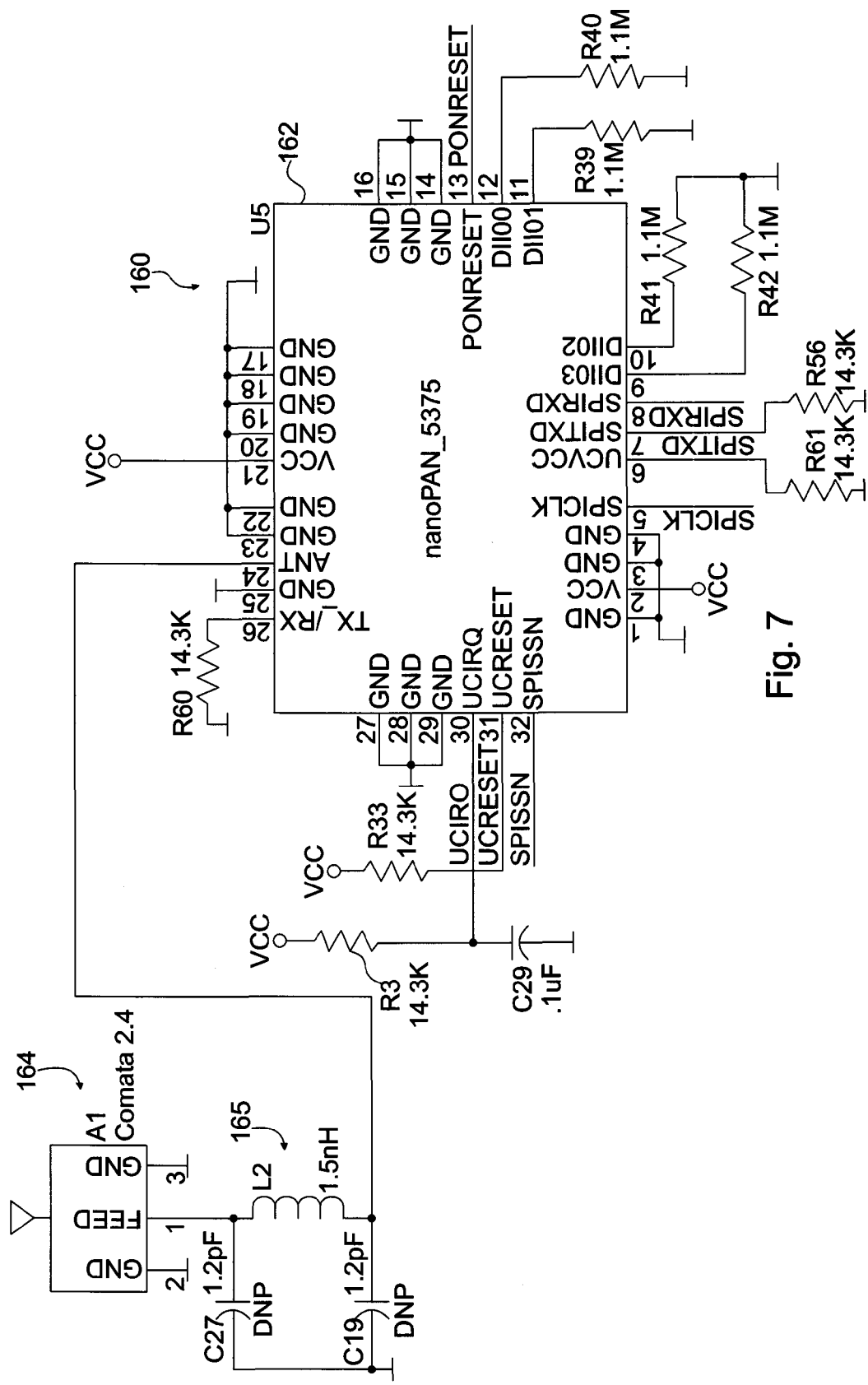
FIG. 7 is a circuit diagram of an embodiment of transceiver circuitry for the animal transceiver unit of FIG. 1.
Figure 8:
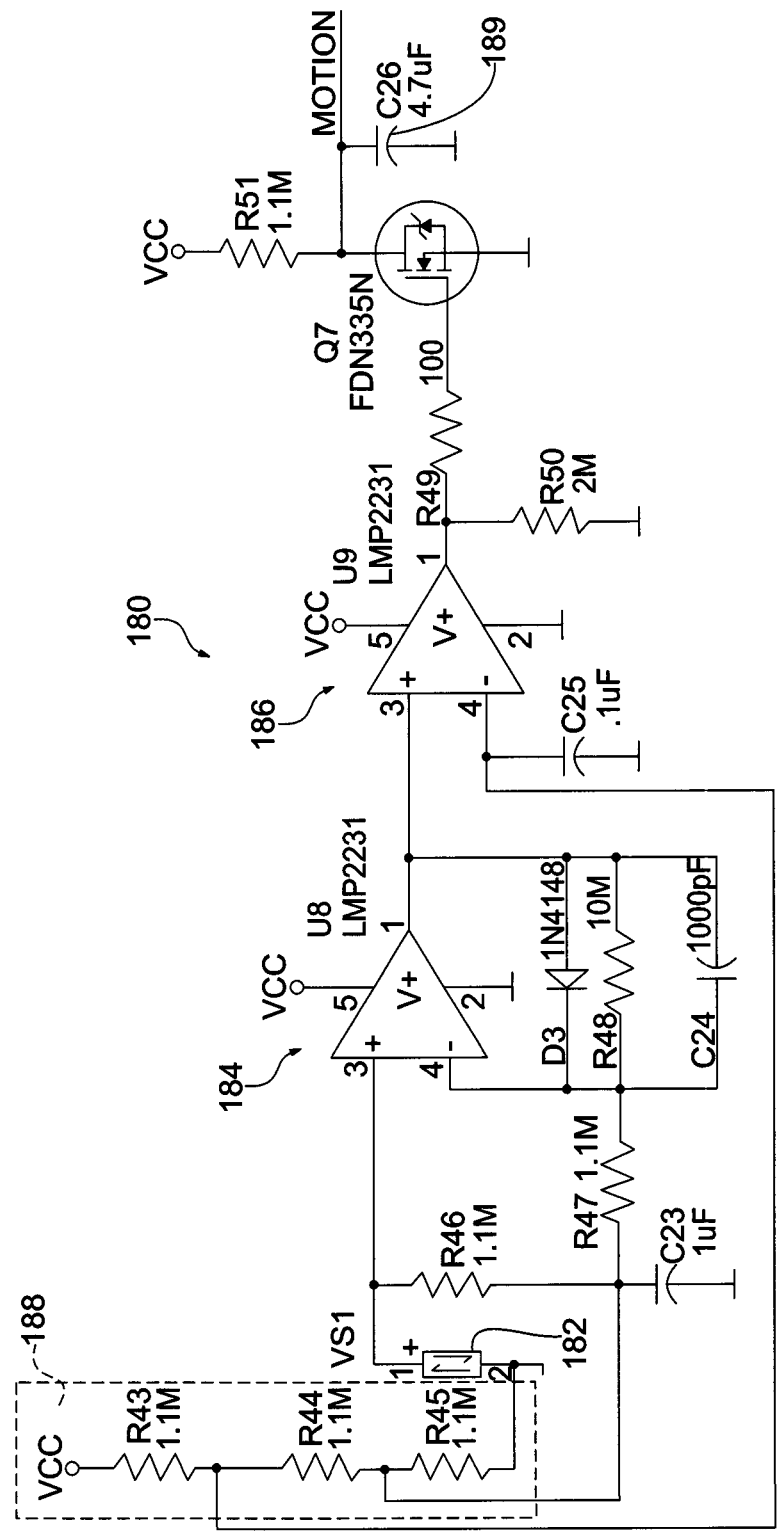
FIG. 8 is a circuit diagram of an embodiment of motion detector circuitry for the animal transceiver unit of FIG. 1.
Figure 9:
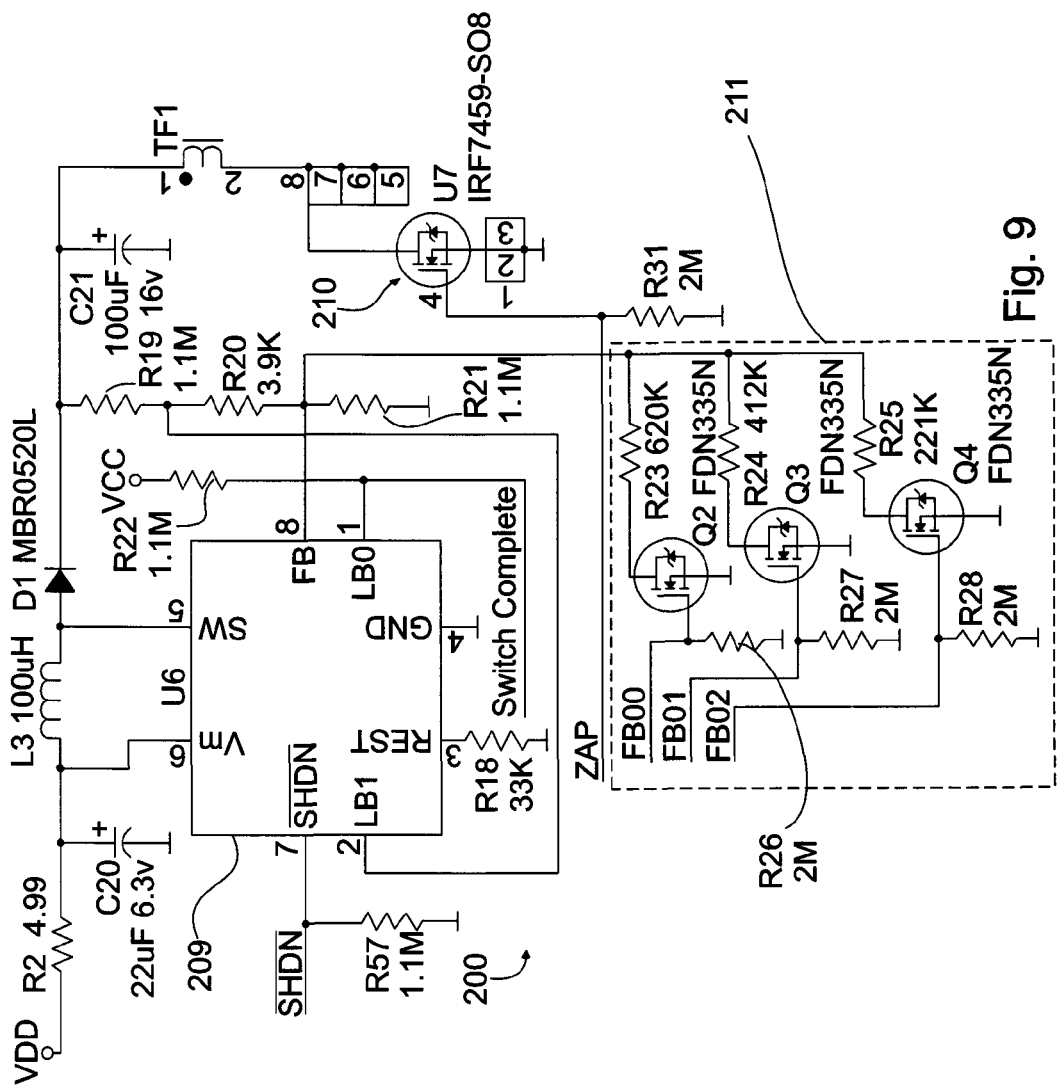
FIG. 9 is a circuit diagram of an embodiment of electrical shock circuitry for the animal transceiver unit of FIG. 1

The animal transceiver unit 100 also includes controller circuitry or processor circuitry 140 having a microprocessor or controller 146 for controlling the operation of the animal transceiver limit as shown in FIG. 6. In general, the controller circuitry 140 communicates with transceiver circuitry 160 as shown in FIG. 7. The transceiver circuitry operates to effect electronic signal communications, such as RF signal communications, between the animal transceiver unit 100 and the base transceiver unit 400. The controller circuitry 140 also operably communicates with motion detection circuitry 180 as shown in FIG. 8. The motion detection circuitry functions to detect when the animal is in motion or at rest in part to effect control by the controller circuitry over battery life. If the motion detection circuitry 180 detects that the animal is in motion then the processor 146 may be awoke and certain operational circuitry powered up. As an additional or alternative option, the frequency of communication may be increased between the base unit 400 and the circuit unit 100 to more quickly calculate or determine the relative distance between the base unit and the animal unit. However, if the motion detection circuit 180 detects that the animal is at rest or is not moving beyond a threshold or degree of movement or time, or both, then the processor 146 may go to sleep and certain operational circuitry may be powered down. The controller circuitry 140 also communicates with animal control circuitry that includes shock generation circuitry 200 as shown in FIG. 9 and audible stimulus circuitry 205 as shown in FIG. 6. The animal control circuitry functions to provide correction stimulus or signals to the animal under selected conditions. The animal correction circuitry for example functions to provide tone or shock signals, or both, for correction of the animal.

Turning more specifically to the controller circuitry 140 of the animal unit 100 as shown in FIG. 6, a microcontroller 146 is provided in the form of a microprocessor U1, an Atmel Mega 644 processor chip. The microprocessor 146 is connected at lines XTAL1 and XTAL2 with a clock in the form of a crystal 148, as shown in FIG. 11, in order to control timing of the microprocessor 146. The microprocessor is also connected with the power supply 120 at VCC to supply operating voltage VCC to the processor 146. The processor 146 also functions to monitor the voltage VDD of the power supply that is used to power the shocking circuitry 200 and the speaker circuitry 205 and performs, for example, operations related to the detection of low battery signals, such as actuating the speaker 206 of the speaker circuitry 205 when the battery voltages drops below a certain level.

The microprocessor 146 is also connected with the transceiver circuitry 160, as shown in FIG. 7, to control operation of the transceiver circuitry and to control signal communications been the transceiver circuitry 160 and the base transceiver unit 400. The transceiver circuitry 160 of the animal transceiver unit 100 includes a transceiver chip 162 in the form of nanoPAN 5375 chip U5. The transceiver chip 162 provides signal communications in the form of RF signals through antenna 164. The transceiver chip 162 includes internal transceiver circuitry that is configured to transmit an output through a 20 db output amplifier to boost the output signal. The internal transceiver circuitry is also configured to be connected or switched to a receiving position in order to receive input signals such as RF signals transmitted from the base transceiver. In order to conserve power, the antenna 164 is connected with the transceiver chip 160 through an impedance matching network 165. In order to effect communication between the processor 146 and the transceiver chip 162, the processor 146 sends a slave select signal over line SPISSN to transceiver chip 162. At power up, a power on reset signal is sent from the processor 146 to the transceiver chip 162 over the PONRESET line. Interrupt requests and reset signals are also communicated from the processor 146 to the transceiver chip 162 over the VCIRQ and UCRESET lines respectively. A clock signal from the processor 146 is also supplied to the transceiver chip 162 over SPICLK line. Transmission and reception signals are supplied between the processor 146 and the transceiver 162 over transmission line SPITXD and reception line SPIRXD. Power is supplied to the transceiver chip 162 at the VCC pins.

As shown in FIG. 8, the microprocessor 146 also communicates with the motion detector circuitry 180 along the MOTION line. The Motion sensor circuitry 180 functions to detect movement of the animal on which the animal unit 100 is monitored or carried and serves to provide an output signal along the MOTION line to the microprocessor 146. The microprocessor 146 is coupled with the motion sensor circuitry in order to control operations of the animal transceiver unit in response to the detection of motion or lack of motion by the animal. The motion sensor circuitry 180 of the animal transceiver unit 100 operates to detect motion or lack of motion of the animal transceiver unit 100 through a motion detector element 182 in the form of a piezzo transducer VS1. The motion detector element 182 is connected to an amplifier circuit 184 that includes amp U8 to provide an amplified output signal which is supplied to an input of a comparator circuit 186 that includes comparator U9. The compactor U9 compares the output from the amplifier to a reference level to generate an output when the amplified signal exceeds the reference level. The output from the comparator is supplied to switch transistor Q7 which functions to switch ON in response to a HIGH output from the comparator circuit 186. In addition, a voltage divider circuit 188 is provided as type of violation control circuit to supply a selected voltage to the amplifier 184 at pin 4 of U8 and a selectable reference voltage to the comparator 186 at pin 4 of U9. The reference voltage supplied to comparator U9 may be adjustable. For example, the processor 146 may control and selectively change the resistance of Resistor 44 of the voltage divider to vary and control the reference voltage supplied to pin 4 of U9. In operation, when the motion detector element 182 senses movement of the dog, a voltage is produced by the transducer 182 and is supplied to the input of the amplifier at pin 3 of U8. The voltage produced by the motion detector element 182 is amplified by amplifier 184 and supplied as an amplified output signal from the output of the amplifier to the input pin 3 of comparator U9. When the voltage of the input pin 3 of U9 exceeds the reference voltage at pin 4 of U9 the output of U9 goes HIGH which turns switch transistor Q7 ON which in turn causes the output capacitor 189 to discharge which creates a digital logic LOW supplied on MOTION line to the microprocessor 146 so that the microprocessor detects that there has been movement of the dog. When there is no motion, or relatively little motion, by the dog, the motion detector element 182 produces no output, or a minimal output that is below a selected threshold, that is supplied to the amplifier 184. The signal provided at input pin 3 of the amplifier unit U8, whether a zero output or a minimal level signal, is amplified by the amplifier and supplied to the input pin 3 of the comparator U9. If the input supplied at input pin 3 of the comparator U9 is below the reference voltage supplied at pin 4 of U9 then the output from the comparator will be LOW. The LOW output from the comparator U9 is then supplied to the gate of the switch transistor Q7 which turns OFF or keeps transistor Q7 OFF thereby maintaining the charge on the capacitor 189. By maintaining the charge on the capacitor 189, a digital HIGH signal is then supplied along the MOTION line to the microprocessor 146 thereby instructing the microprocessor 146 that the dog is at rest and not in motion. Furthermore, the internal capacitance of the motion detector element 182 combined with resistor R46 function together with resistor R47 and R48 and compacitors C23 and C24 to provide a band pass response. Specifically, the band pass response is centered around 10 hz in order to prevent detection of non-significant movement such as created by panting, barking or ambient noise. The reference level of the comparator U9 may also be adjusted higher to help prevent switching transistor Q7 from turning ON in response to movements below a desired threshold.

As shown in FIG. 10, an optional programming circuit 220 is provided to effect communication with the controller circuitry to enable the entry of programming information or instructions to the controller 146. The programming circuit 220 may be provided in the form of a series of programming pins TP1-TP8 to enable programming information to be supplied to the microprocessor 146, along lines TDI, TMS, TDO, TCK, PD1 and PD2.

The microprocessor 146 is also connected with and communicates with the animal control circuitry 200 and 205 in order to provide output control stimulus to the animal. For example, the controller functions to control output of an audible signal from audible sound or alarm generator circuit 205, as shown in FIG. 6, and of an electric stimulus to the animal in the form of an electrical shock produced by shock generator circuit 200 by energizing the primary coil TF 1 which in turn causes the secondary coil probes that contact the animal to apply a shock to the animal. More specifically, as shown in FIG. 6, the microprocessor 146 functions to produce an audible output through the speaker 206 of the speaker circuitry 205 over the BEEP line. A HIGH output on the BEEP line turns ON switch transistor Q5 that activates speaker 206 through VDD to produce an audible output to the animal. The controller circuitry 146 also functions to generate an electric stimulus to the animal over the ZAP line, as shown in FIGS. 6 and 9. When a shock is to be administered, the controller outputs a ZAP signal over the ZAP line.

Turning more specifically to the shock circuitry 200, as shown in FIG. 9, is used to provide an electrical stimulus or correction to the animal, a boost switching converter circuit 209 is provided in the form of chip U6, chip LT1316 manufactured by Linear Technologies. The boost switching converter circuit 209 functions to convert the input voltage of approximately VDD or 3.2 volts produced at the power supply circuit 120 and supplied at pin 6 into an output voltage at pin 5, optionally of discreet selectable levels, for example, between 3.6 volts and 12 volts to generate a selected level of shock to the animal. The use of different levels of output from the convertor 209 at pin 5 may be used to selectively generate different levels of shock to the animal. More specifically, the output voltage from the boost switching converter 209 is supplied through diode D1 to the shock discharge capacitor C21. The level of the output voltage may be adjustable by the user. For example, the FB pin of the chip U6 may be switched to ground through different but selectable levels of resistance to achieve discreet levels of voltage output for supply to discharge capacitor C21 to achieve selectable shock levels of different magnitude. In order to provide an adjustable or selectable output voltage, three MOSFET switch transistors Q2, Q3, and Q4 function with the boost switching convertor circuit 209 to provide shock level control circuitry 211. The microprocessor 146 is connected with each of the transistors Q2, Q3, and Q4 over lines FB00, FB01, and FB 02, respectively, in order to provide a series of eight different levels of shock output to be applied to the animal through shocking coil TF1. When conditions are met to require a shock to be applied to the animal, the microprocessor 146 provides an output signal over the ZAP line to power switch 210 in the form of chip U7, chip IRF7459, which turns switch U7 ON to allow current to flow through the shocking coil TF1 and switch U7 to provide the desired level of shock to the animal as determined by shock level signals supplied from the controller 146 to switch transistors Q2, Q3 and Q4 over lines FB00-FB02. As such, a series of selectable voltages levels may be supplied through shocking coil TF1 to provide controls over the level of shock to the animal. In order to conserve battery power, the microcontroller 146 is connected with the converter 209 through $\overline{SHDN}$ line. The $\overline{SHDN}$ line functions to turn the converter 209 off when animal correction is being utilized in order to conserve battery power. The converter 209 also communicates with the microprocessor 146 over a SWITCH COMPLETE line. The SWITCH COMPLETE line is utilized by the converter 209 to signal to the microprocessor when a desired output voltage has been obtained for supply to the shock coil TF1.

Figure 12A:
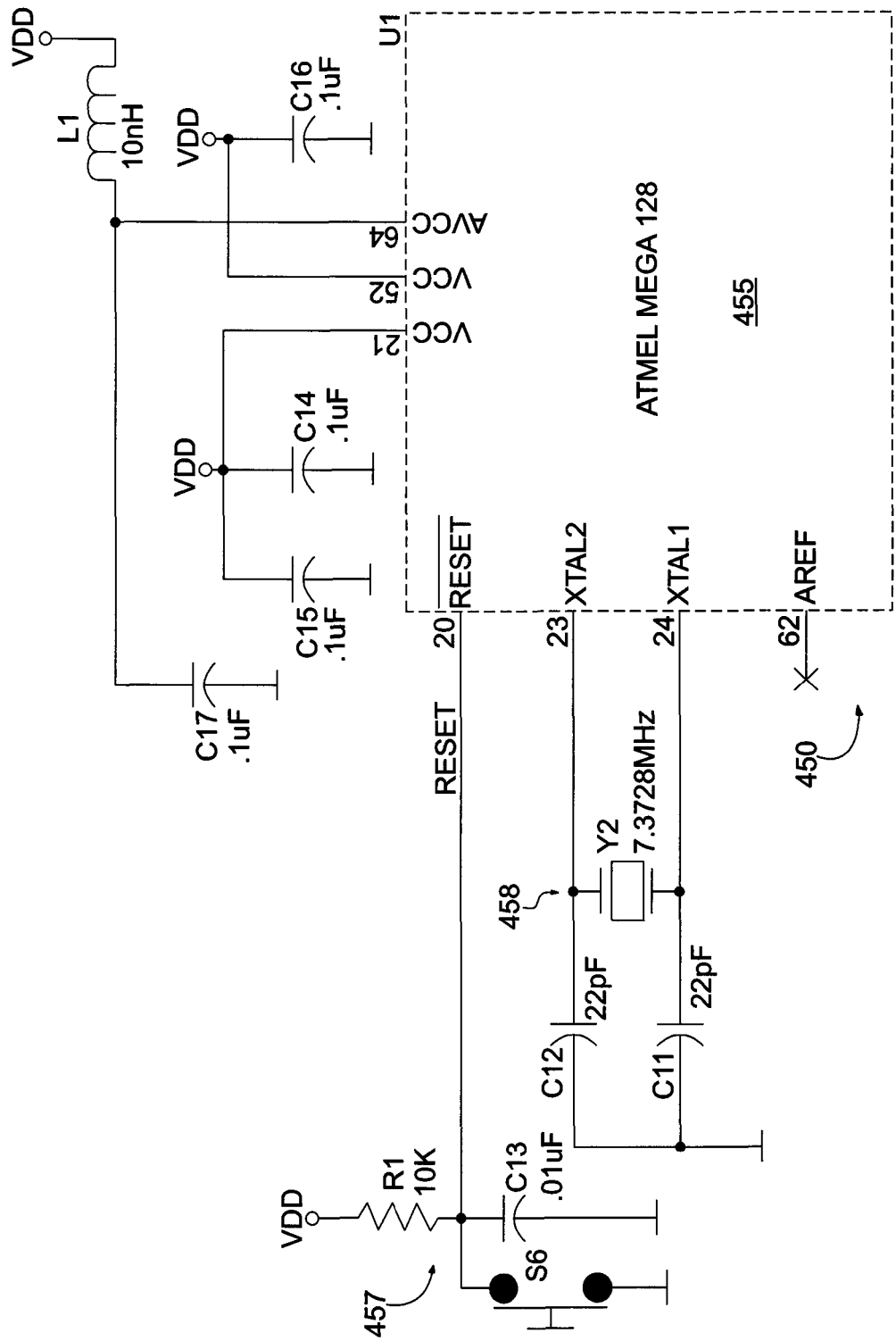
FIGS. 12A, 12B, 12C and 12D are circuit diagrams of an embodiment of the controller circuitry respectively reflecting the four for different quadrants of the controller circuitry depicted in FIG. 12.
Figure 12B:
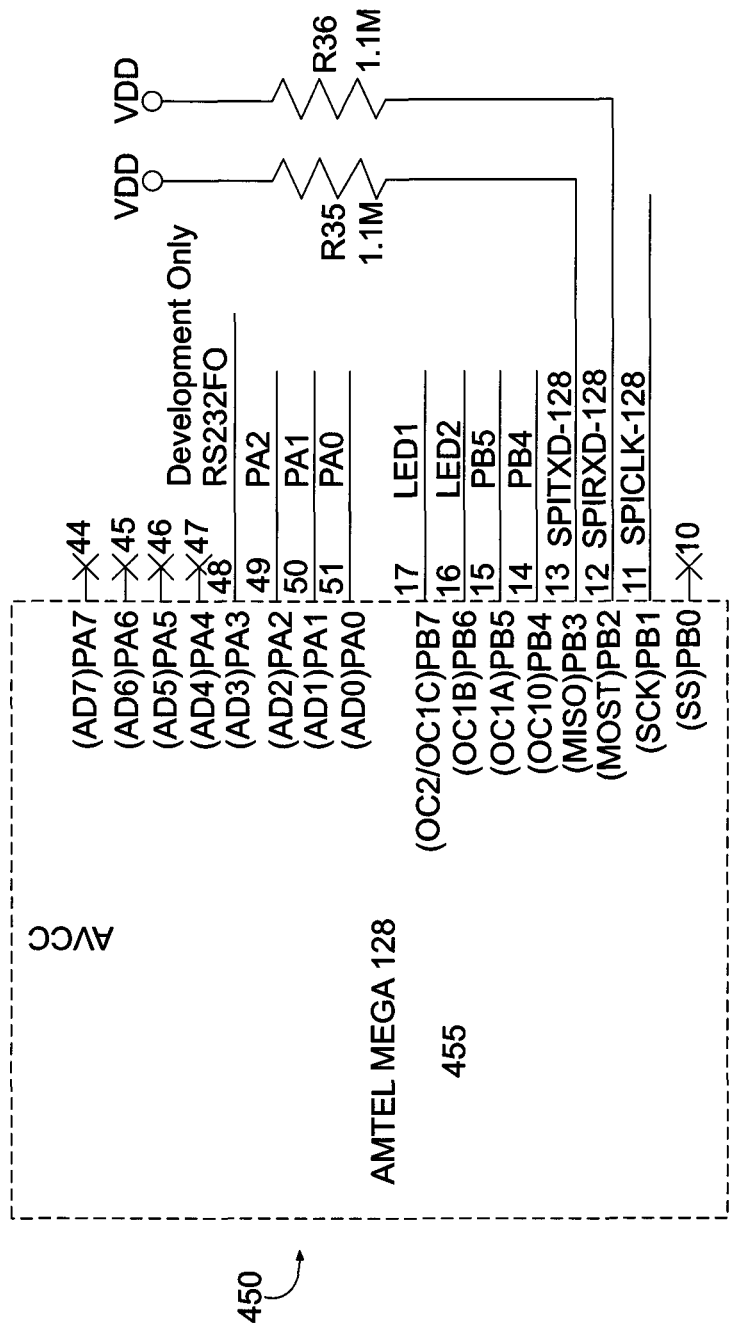

Referring now to the base station circuitry 400, as shown in greater detail in FIGS. 12-24, a controller circuit 450, as shown in FIGS. 12, 12A, 12B, 12C and 12D, is provided to control operation of the base transceiver circuitry. The controller circuitry 450 is connected with and communicates with transceiver circuitry generally designated 470, as shown in FIG. 13, that operates to provide electronic signal communications, such as wireless RF signal communications with the animal transceiver unit 100. The transceiver circuitry 470 provides time of flight ranging so that wireless communication between the base unit 400 and the animal transceiver unit 100 enables real time calculation or determination of a relative distance between the base transceiver unit 400 and the collar transceiver unit 100 carried on the animal and functions to enable real time calculation or determination of the relative distance between the animal unit 100 and the base unit 400 even when one unit is moved toward or away from the other unit. The controller circuit 450 includes a microprocessor or controller 455 in the form of chip U1, an Atmel Mega 128 microprocessor chip. The controller 455 is connected at lines XTAL1 AND XTAL2 with a clock in the form of a crystal 458, as shown in FIG. 12A, in order to control timing of the microprocessor 455. The microprocessor is powered by voltage VDD supplied, for example, at pins VCC, as shown in FIG. 12A.

The controller 455 is also connected with transceiver circuitry 470, as shown in FIG. 13, to control operation of the transceiver circuitry and to control signal communications between the transceiver circuitry 470 and the animal transceiver unit 100. The transceiver circuitry 470 of the base transceiver unit 400 includes a transceiver circuit 475 in the form of transceiver chip U5, a nanoPAN 5375 chip. The transceiver chip 475 provides signal communications in the form of RF signal through antennas 471 and 472, Antenna 1 and Antenna 2. The transceiver chip 475 includes internal transceiver circuitry that is configured to transmit an output through a 20 db output amplifier to boost the output signal. The internal transceiver circuitry is also configured to be connected or switched to a receiving position in order to receive input signals such as RF signals transmitted from the animal transceiver unit. Voltage VCC is supplied to the transceiver chip 475 at the VCC pin.

Figure 14:
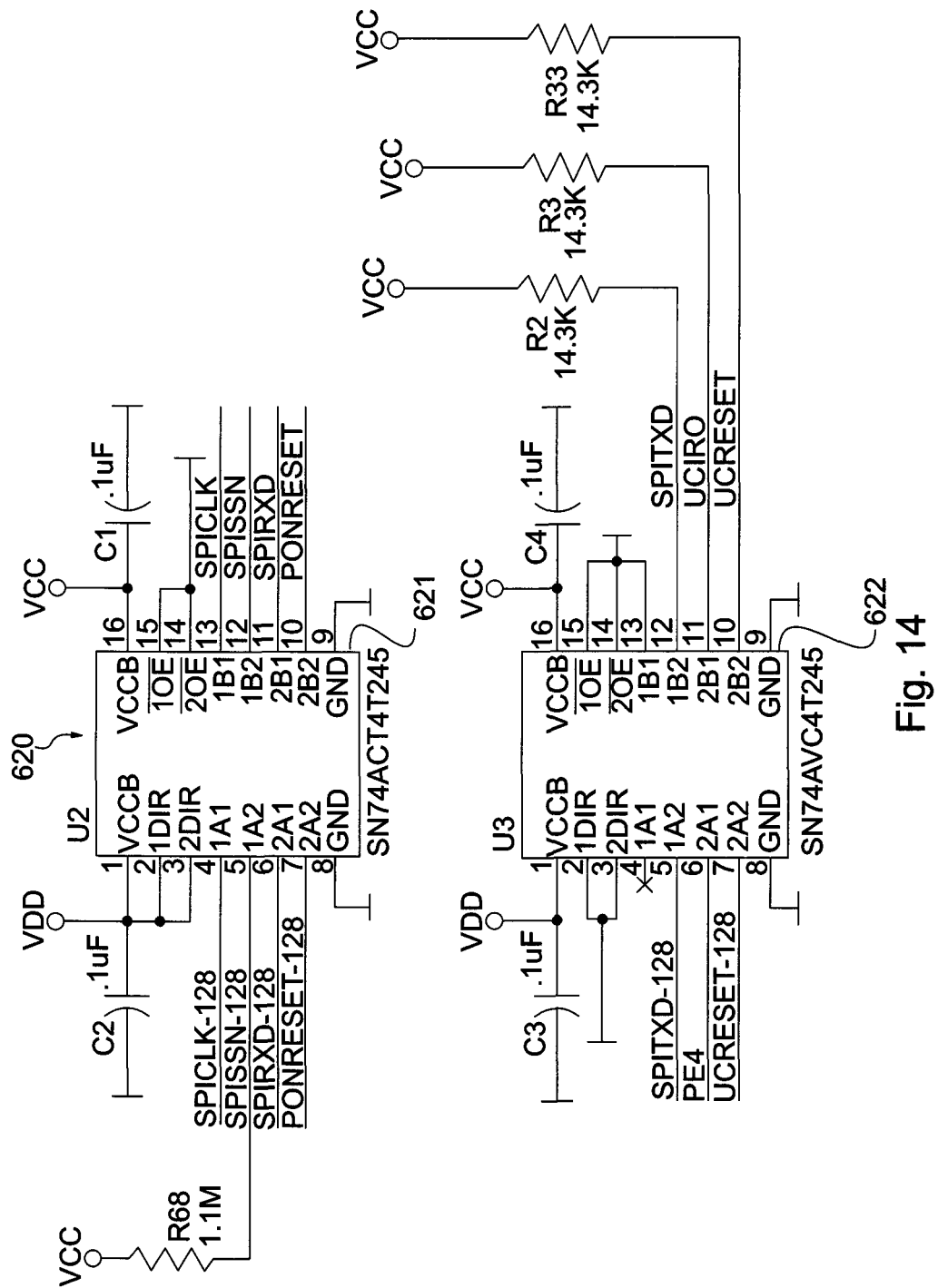
FIG. 14 is a circuit diagram of an embodiment of a converter circuit for converting digital logic levels of signals for communication between the controller circuitry and the transceiver circuitry of the base transceiver unit shown in FIGS. 1 and 2.

In order to provide electrical signal communication between the controller 455 of the controller circuitry 450 and the transceiver chip 475 of the transceiver circuitry 470, a logic level converter circuit 620, as shown in FIG. 14, may be needed. The logic level converter circuitry 620 functions to convert signals between the controller 455 and the transceiver 475 to different voltage logic levels for an embodiment in which the controller 455 and the transceiver 475 are designed or configured to operate at different digital logic levels. More specifically, the controller unit 455 may operate at VDD or 3.2 volts whereas the transceiver unit 475 may operate at VCC or 2.5 volts. In order to provide communications between the two units, the logic levels need to be converted between the 2.5 volt logic communication level of the transceiver chip 475 and the 3.2 volt logic level used by the controller 455. For this purpose one or more converter chips 621 and 622 in the form of chips U2 and U3, chip SN74AVC4T245, are utilized to provide sufficient conversion channels or lines to enable appropriate conversion of signals to and from the controller chip 455 and the transceiver chip 475.

In order to effect communication between the processor 455 and the transceiver chip 475, the processor 455 sends a slave select signal over line SPISSN to transceiver chip 475. At power up, a power on reset signal is set from the processor 455 to the transceiver chip 475 over the PONRESET line. Interrupt requests and reset signals are also communicated from the processor 455 to the transceiver chip 475 over VCIRQ and UCRESET lines respectively. When a converter 620 is utilized, the communication lines between the processor 455 and the transceiver chip 475 are connected and converted through the converter 620. For example, the interrupt request that is sent from the transceiver 475 over the UCIRQ line is converted by the converter 620 and supplied to the processor 455 over the PE4 line. A clock signal from the processor 455 is also supplied to the transceiver chip 475 over the CPICLK line. Transmission and reception signals are supplied between the processor 146 and the transceiver 162 over transmission line SPITXD and reception line SPIRXD.

Figure 15:
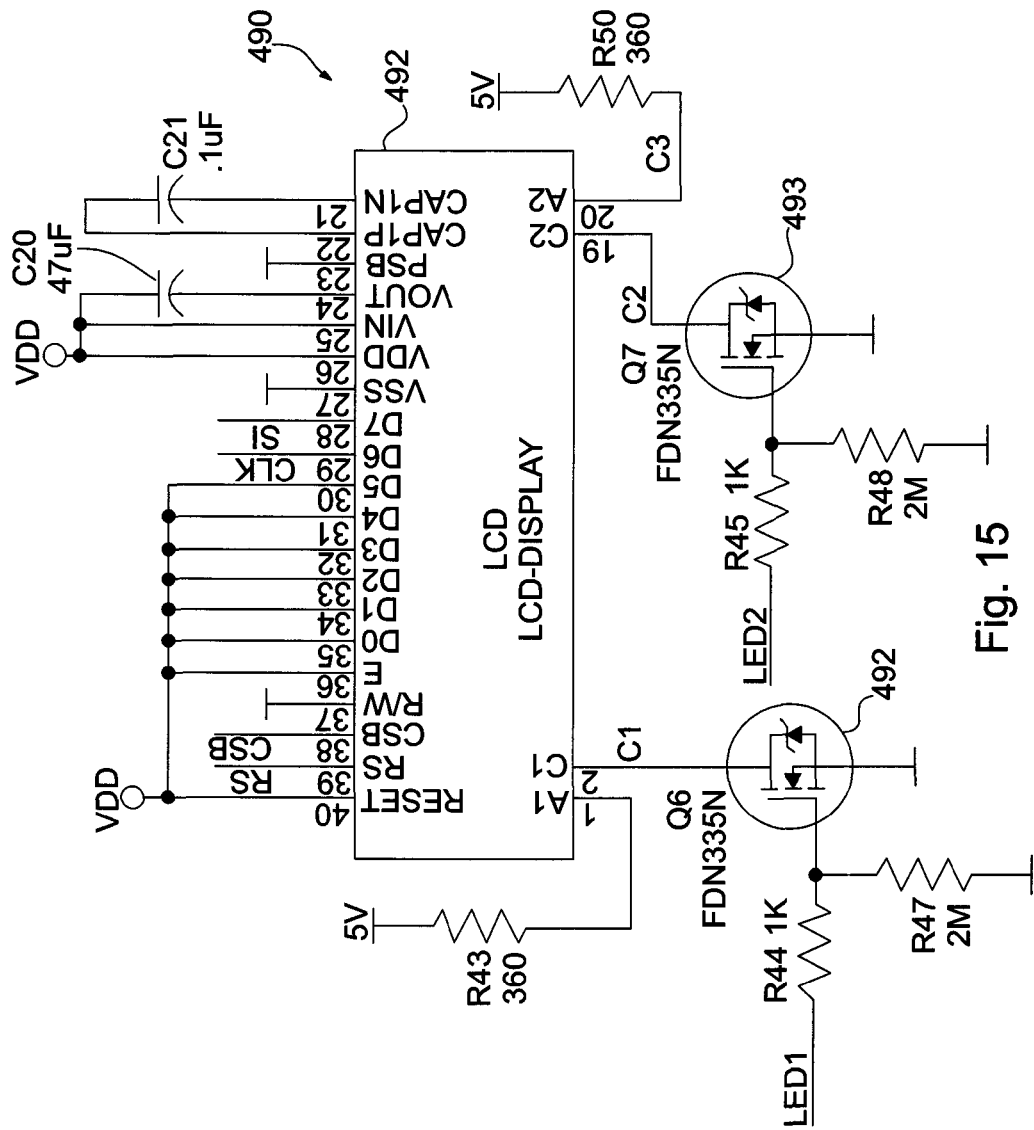
FIG. 15 is a circuit diagram of an embodiment of an output display circuit for the base transceiver unit shown in FIGS. 1 and 2.

As shown in FIG. 15, the controller circuitry 450 also communicates with and is connected with display circuitry 490, that may be in the form of an LCD display 492, to display information to the user. For example, the output display may display such information as a selected distance control boundary such as 150 feet, the actual distance that the animal transceiver unit 100, e.g., the animal, is located from the base transceiver unit 400, various messaging data such as battery status and boundary challenge or boundary violation notifications, communication status between the animal transceiver and the base transceiver units such as an existing communications link or the loss of such link as well as other information such as user menu selection items or low battery indication. Optionally, one or more LED backlight displays may be operated using LED1 and LED2 lines connected with the controller 455 and the LCD display 492 through switches 492 and 493 in the form of switching transistors Q6 and Q7. When LED1 line goes HIGH from the controller 455, transistor Q6 is turned ON and the first LED arrangement is illuminated. Likewise, when LED2 goes HIGH from the controller transistor Q7 is turned ON and the second LED arrangement is illuminated. One of the LED lines may be used to simply turn on and off a selected color of backlight. The other LED line may be utilized to provide a multicolor display depending on information received by the LCD display from the microprocessor unit. The LCD display 492 is powered by voltage VDD.

Figures 18, 19:
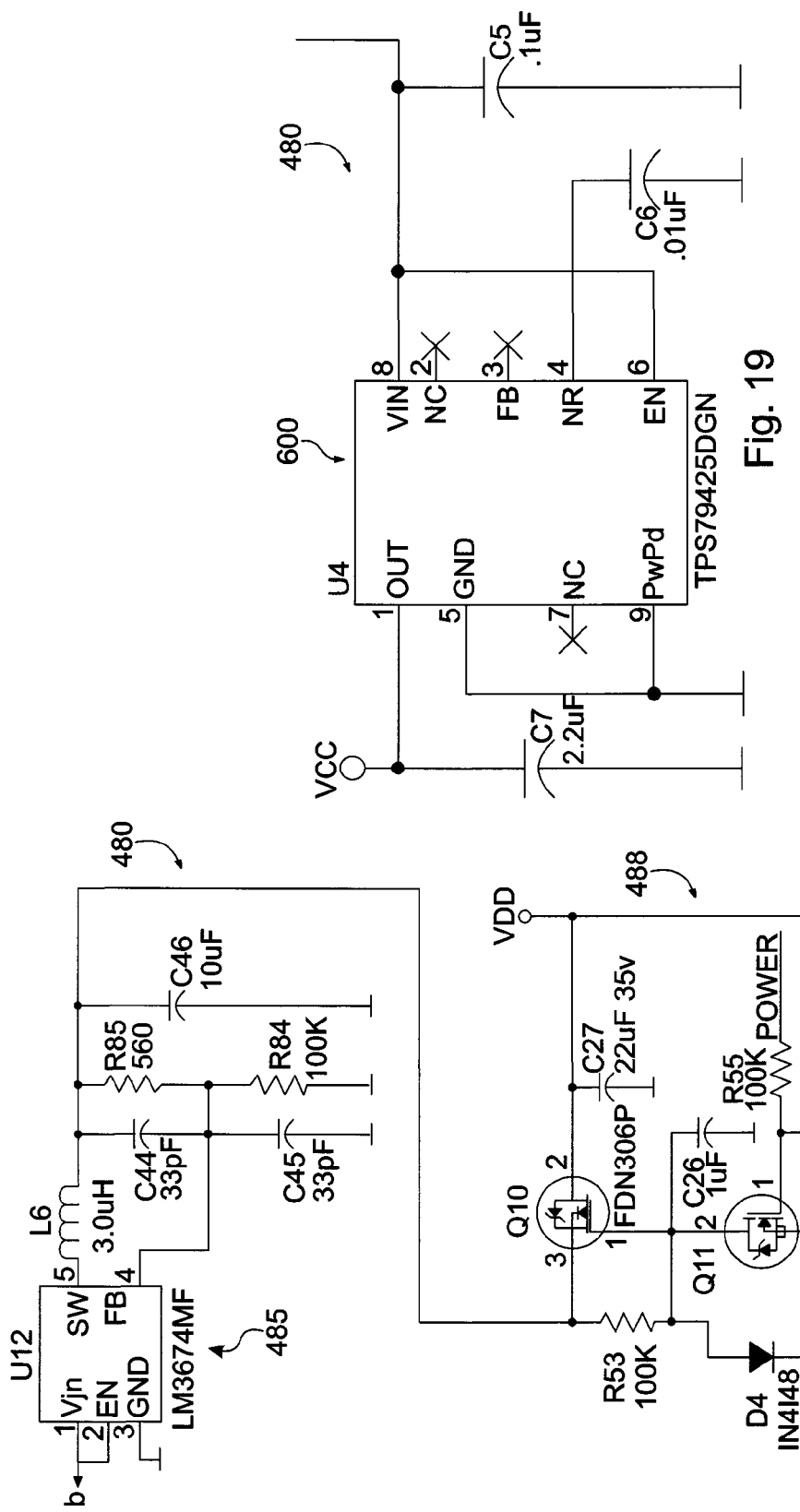
Figure 20:
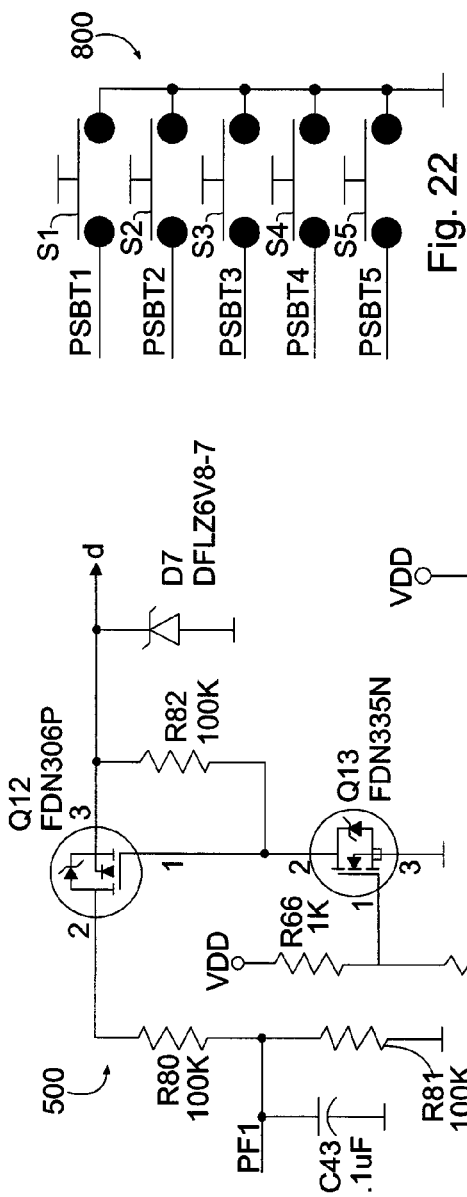
FIG. 20 is a circuit diagram of an embodiment of optional diagnostic voltage monitoring circuitry for the base transceiver unit of FIGS. 1 and 2.
Figure 21:
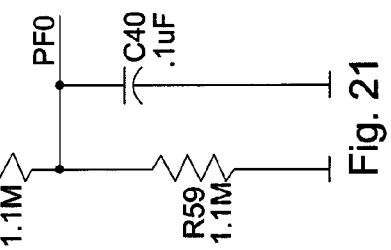
FIG. 21 is a circuit diagram of an embodiment of optional diagnostic voltage monitoring circuitry for the base transceiver unit of FIGS. 1 and 2.

The base transceiver unit 400 also includes power supply circuitry 480, as shown in FIGS. 16-19, for supplying power to the operational circuitry of the base transceiver unit. Diagnostic voltage monitoring circuitry 500, as shown in FIG. 20, may also be provided to enable the controller circuitry 450 to monitor selected voltage levels in the circuitry. For example, diagnostic voltage monitoring circuitry 500 may be provided to monitor a voltage level, such as 5.6 volts, used to supply adequate voltage to voltage chargers 484 and 1483 for battery 1 and for battery 2 respectively. Similarly, diagnostic voltage monitoring circuitry 502, as shown in FIG. 21, may be provided for monitoring a voltage level of VDD, such as 3.2 volts. The power supply circuitry 480 also includes power ON switching circuitry 488, as shown in FIG. 18, for SWITCHING the supply of an operating voltage, such as VDD, on or off to operating circuitry of the unit 400. A voltage regulator circuitry 600, as shown in FIG. 19, is provided and may potentially be connected with or coupled to the power ON switching circuitry 488, in order to convert one operating voltage, such as VDD or 3.2 volts to another operating voltage, such as VCC or 2.5 volts. In operation, the voltage VDD may be used to operate the controller circuitry 450 and the display circuitry 490 while voltage VCC is used to operate the transceiver circuitry 470. In order to turn the unit ON, the S1 switch on line PSBT1 may be depressed for a selected period of time. Optionally, to turn the unit 400 OFF, the S1 switch on line PSBT1 may be pressed while the unit is ON and held for a selected extended time period such as five seconds.

Figure 22:
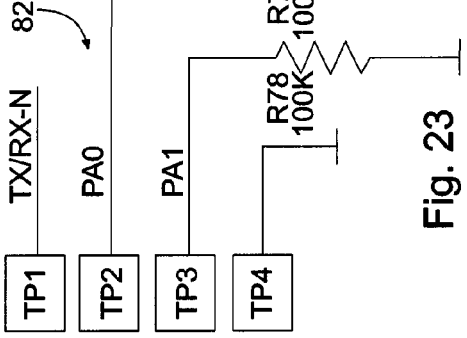
FIG. 22 is a circuit diagram of an embodiment of a user actutable input for the base transceiver unit of FIGS. 1 and 2.

In order to provide user input to the controller 455, a user input 800 is provided, as shown in FIG. 22. The user input circuitry may be in the form of a series of user actuated push buttons S, S2, S3, S4, and S5 on lines PSBT1-PSBT5 to provide selected user inputs to the controller chip 455. Other forms of inputs may also be provided such as a keyboard or other manual or electronic entry device.

Figure 12C:
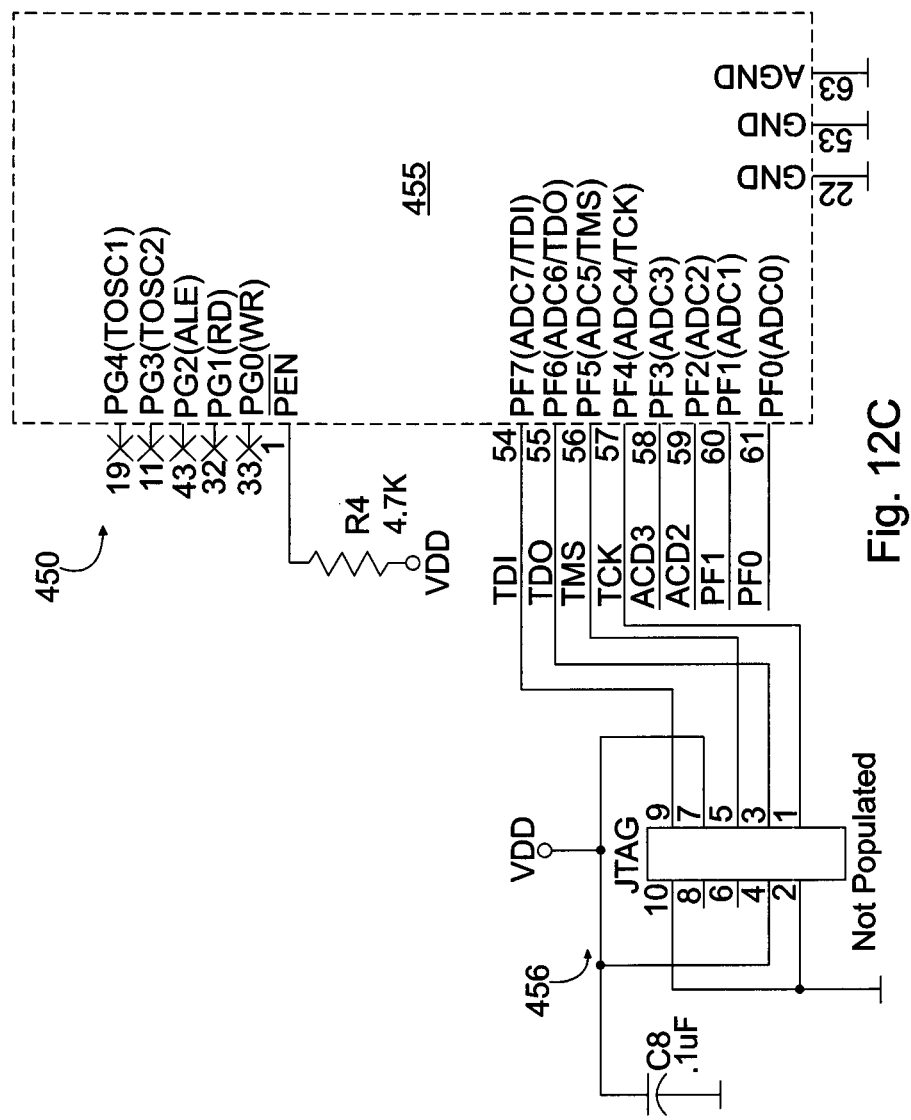
Figure 12D:
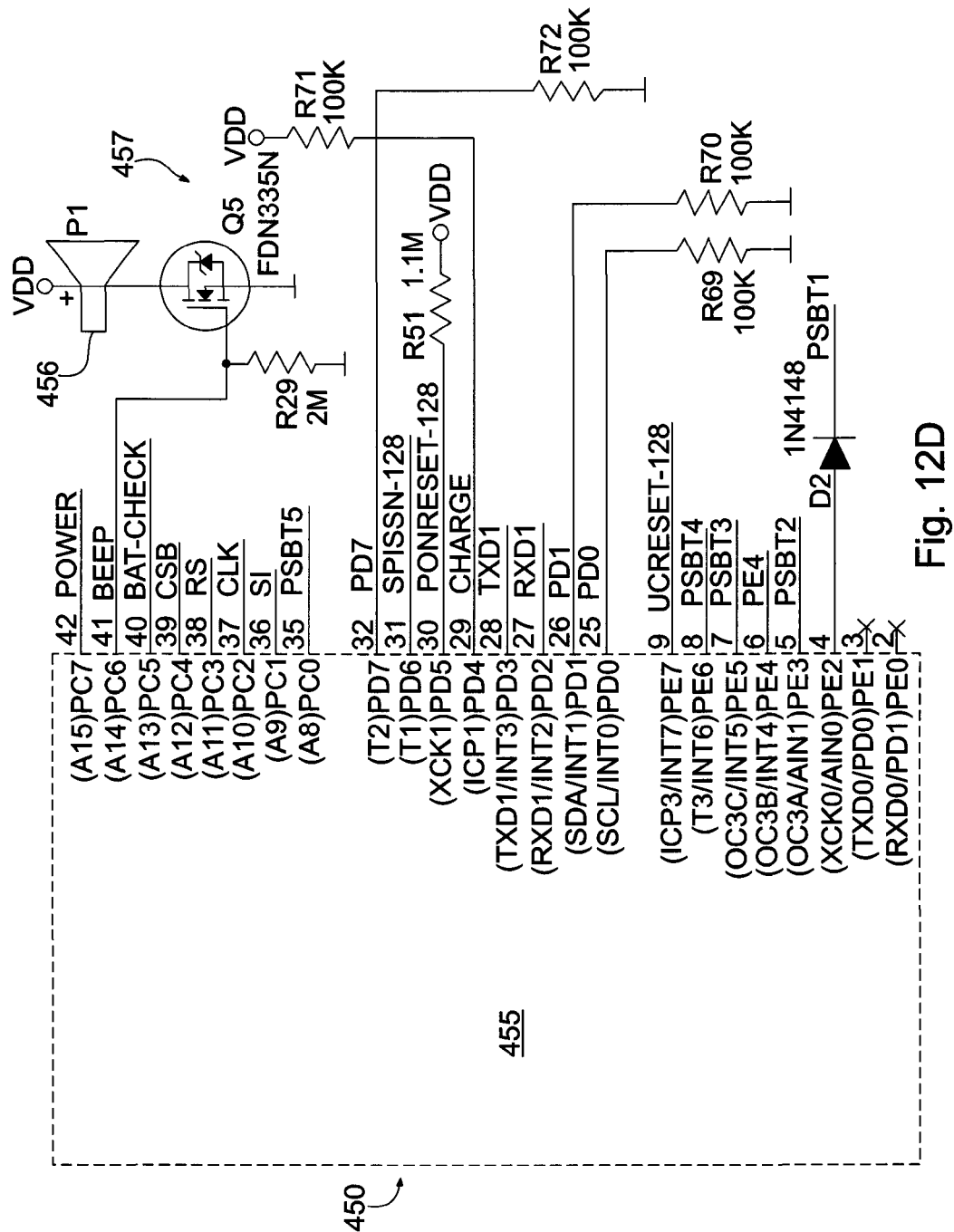
Figure 13:
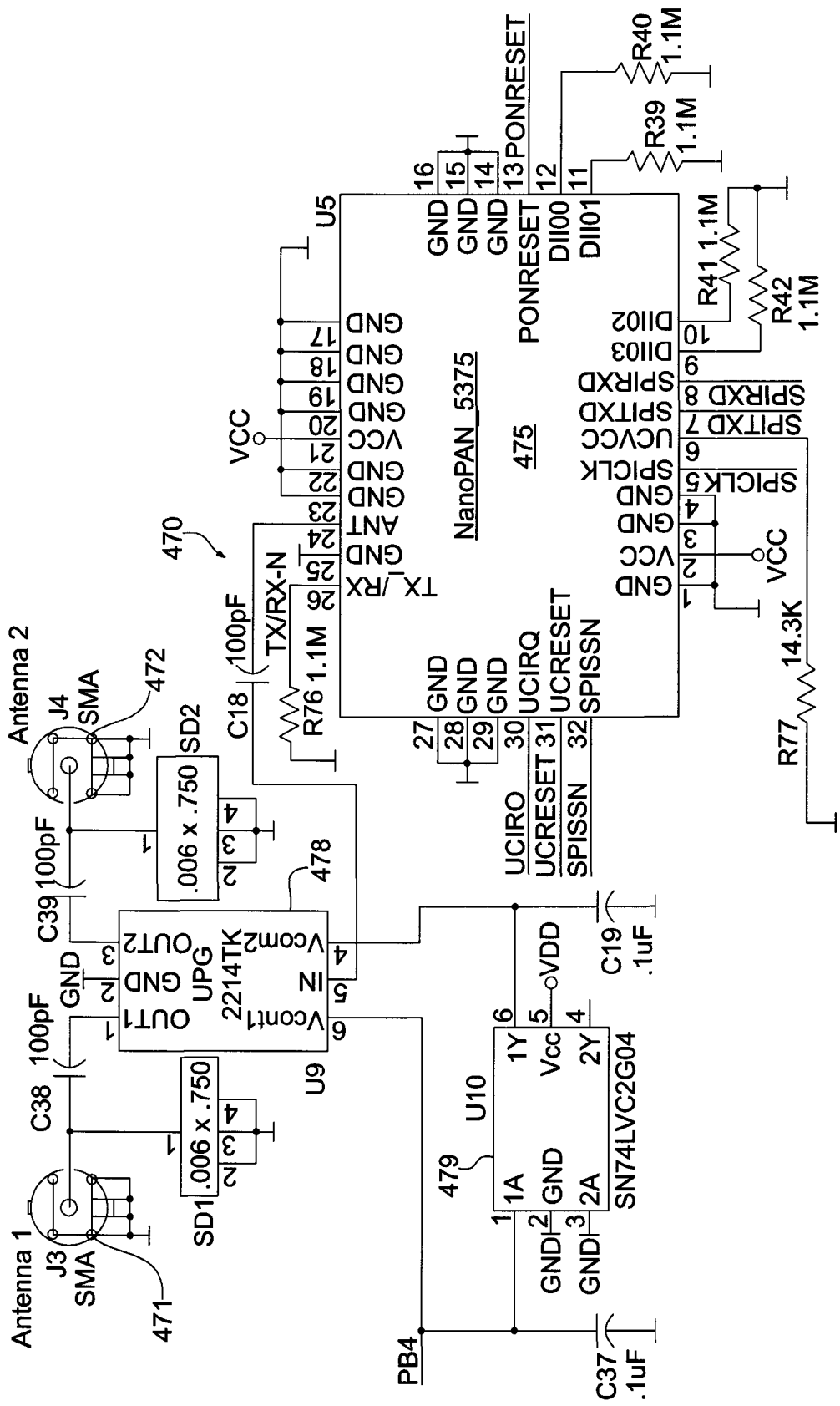
FIG. 13 is circuit diagram of an embodiment of the transceiver circuitry for the base transceiver unit shown in FIGS. 1 and 2.

In order to provide programming instructions to the controller chip 455, programming circuitry 456 is provided, for example, through a JTAG port, as shown in FIG. 12C. The JTAQG port is operably connected with the controller unit 455 to enable programming instructions to be supplied to the controller chip 455.

Figure 23:
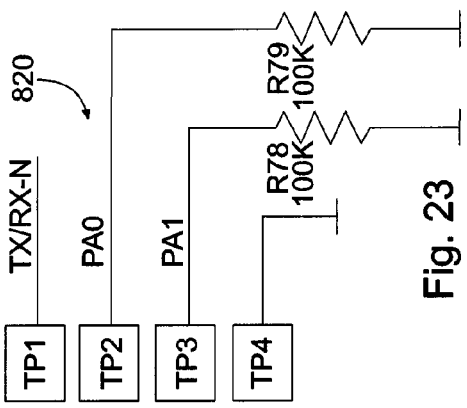
FIG. 23 is a circuit diagram of an embodiment of optional diagnostic circuitry for the base transceiver unit of FIGS. 1 and 2.

In order to enable selected diagnostics to be performed, diagnostic circuitry 820, as shown in FIG. 23, may also be provided in communication with the controller chip 455 and or the transceiver chip 475. More specifically, the diagnostic circuitry 820 may be in the form of pads TP1-TP4 operably connected with the controller chip 455 at lines PA0 and PA1 and with the transceiver chip 475 at the TX/RX-N.

Figure 24:
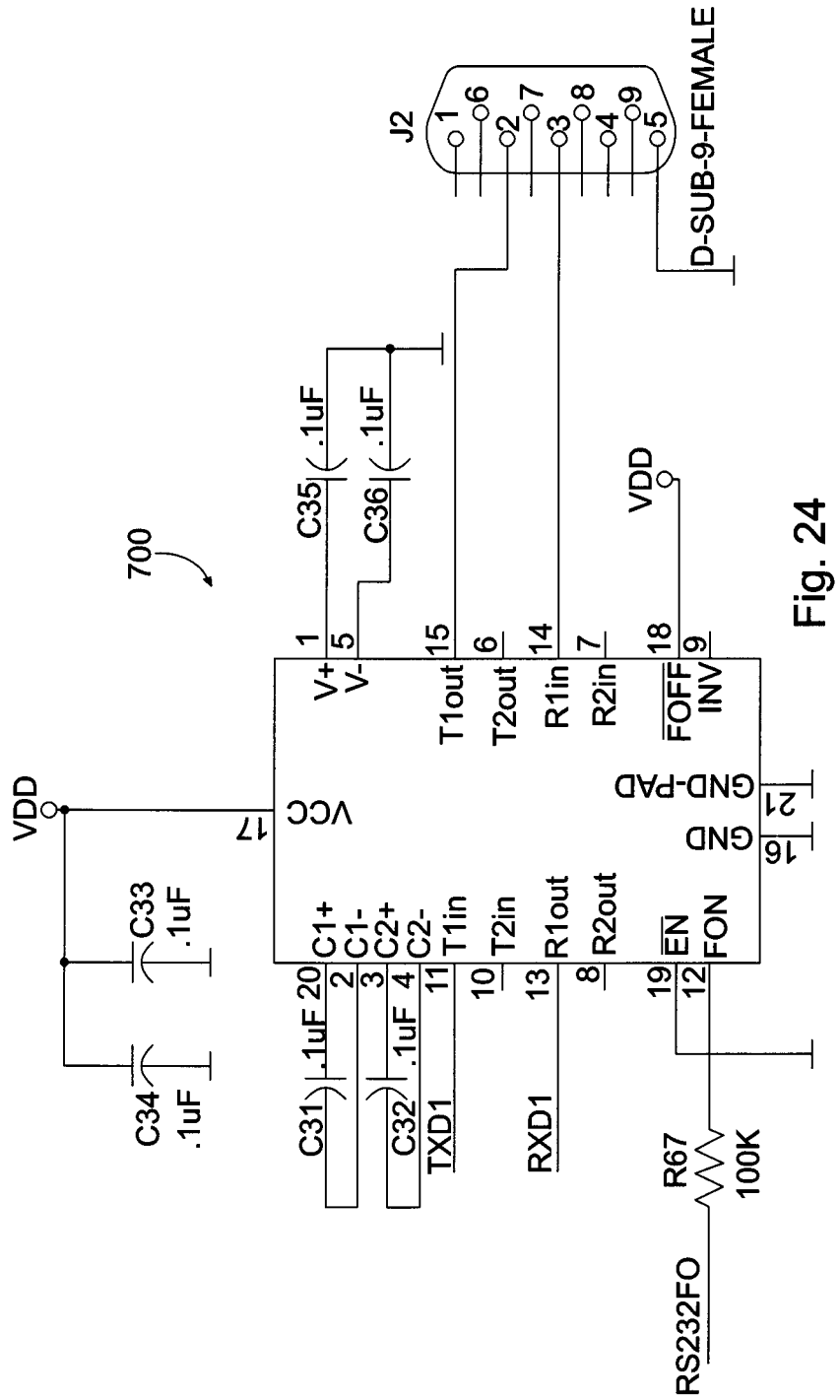
FIG. 24 is a circuit diagram of an embodiment of optional output communications circuitry, such as a communications output port, for the base transceiver unit of FIGS. 1 and 2.

Optionally, as show in FIG. 24, an output communication circuit 700 may also be provided to enable connection with external devices such as a computer. For example, the output communication circuitry may serve to provide a communications port in the form of an RS232 port. Optionally, another communications port may be provided in addition to the RS232 port or as an alternative to the RS232 port such as a USB port or some other similar type of communication port.

An audible signal generator 456 provides an audio speaker or other audible enunciator P1 in operable connection with the processor chip 455 to enable audible or audio announcements to be made. For this purpose, a speaker P1 is connected with the microprocessor 455 through the BEEP line. In order to produce a sound over the speaker, the controller 455 produces a HIGH on the BEEP line that is supplied to the gate of a switch transistor Q5. In response, the switching transistor Q5 turns ON causing an audible output at the speaker P1, as the speaker is connected in circuit with voltage VDD. In operation, different BEEP signals may be used to generate different audible outputs, for example, a continuous BEEP signal may indicate that the animal has breached the control boundary or that signal communication between the base and animal units has failed, whereas an intermittent or cyclical BEEP signal may indicate a low battery.

In order to reset the microprocessor chip 455, a reset circuit 457 is provided, as shown in FIG. 12A, having a user accuatable reset switch S6. The user accuatable switch S6 functions to enable the user to reset the microprocessor and to erase all volatile memory. When switch 456 is closed a LOW signal is produced over the RESET line to the processor 455 to reset the processor.

In order to provide RF communications, the transceiver chip 475 is connected with at least one output/input antenna 471 and/or 472, as shown in FIG. 13. The output/input antenna may include a pair of antennas, antenna 1 and antenna 2, that are arranged approximately a half wave length apart to ensure that null reception is avoided or minimized at both antennas simultaneously. The transceiver chip 475 is connected with the antennas through a single pole double throw RF activation switch 478 provided by chip U9, chip UPG2214TK, which is under control of the microcontroller 455 in order to activate the antenna that is not at a null or that is receiving the best reception. The switch circuitry 478 is operated or controlled by an inverting logic gate 479 provided by chip U10, chip SN74LVC2G04, which functions to select one antenna or the other for activation.

The base transceiver unit 400 also includes power supply circuitry 480, as shown in FIGS. 16-19, for supplying power to the operational circuitry of the base transceiver unit. The power supply circuitry 480 also includes power ON switching circuitry 488, as shown in FIG. 18, for SWITCHING the supply of an operating voltage, such as VDD, on or off to operating circuitry of the unit 400. A voltage regulator circuitry 600, as shown in FIG. 19, is provided and may potentially be connected with or coupled to the power ON switching circuitry 488, in order to convert one operating voltage, such as VDD or 3.2 volts to another operating voltage, such as VCC or 2.5 volts. In operation, the voltage VDD may be used to operate the controller circuitry 450 and the display circuitry 490 while voltage VCC is used to operate the transceiver circuitry 470. In order to turn the unit ON, the S1 switch on line PSBT1 may be depressed for a selected period of time. Optionally, to turn the unit 400 OFF, the S1 switch on line PSBT1 may be pressed while the unit is ON and held for a selected extended time period such as five seconds.

Figure 16:
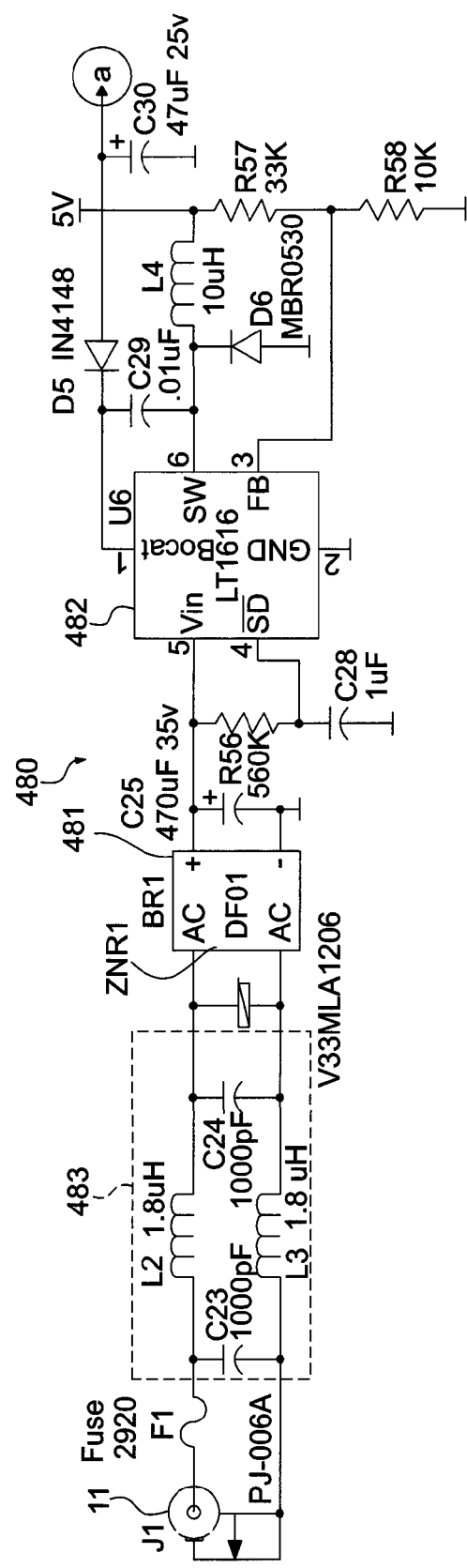
FIGS. 16, 17, 18 and 19 are circuit diagrams of an embodiment of the power supply circuitry for the base transceiver unit of FIGS. 1 and 2.
Figure 17:
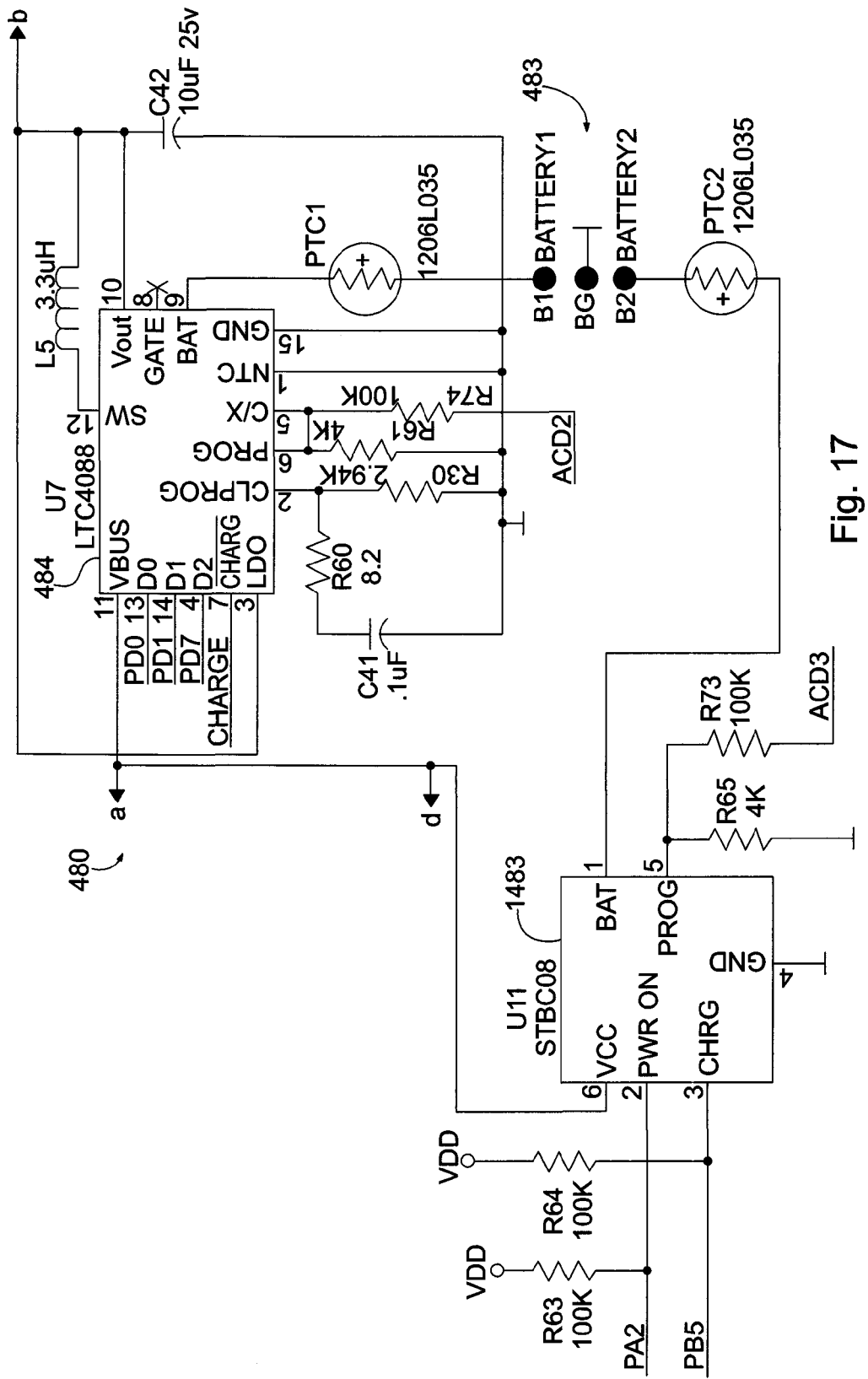

Turning now more specifically to the operation of the power supply circuitry 480, a power jack input 11 in the form of J1, as shown in FIG. 16, is provided to enable connection with various external power supply sources. The jack J1 is in turn connected with a fuse F1 which functions for the protection of the circuitry from electrical overloads. The F1 fuse may be in the form of a self-resetting fuse. A filter 483 is provided to back filter radio frequency signals from the jack J1 to prevented unwanted signals from being sent back through the jack J1. The filter includes capacitors C23 and C24 and inductors L2 and L3. A transient voltage suppressor ZNR1 is provided optionally in the form of a ZENER diode to suppress various transient voltages. A rectifier bridge 481 is provided in the form of bridge chip BR1 in order to convert an AC input to a DC output. A buck regulator or variable voltage converter, generally designated 482, is also provided after the bridge 481 to convert a variable DC voltage input to a desired DC output level. For example, the converter 482 may include a converter chip U6, chip LT1616 manufactured by Linear Technologies. In operation, the chip may function to convert a DC input voltage between approximately 6 and 35 volts depending on the supply source to a DC output of approximately 5.6 volts. The 5.6 voltage output from the converter 482 is utilized to operate a pair of battery charger circuits 1483 and 484, as shown in FIG. 17. Battery charger 1483 is connected with the output of the converter 482 to charge a spare battery B2 so that a spare battery is always available for use in the animal transceiver unit 100. For this purpose, the battery charges circuit 1483 includes chip U11, chip STBC08, that is connected with the output of the converter 482 and the battery receptacle circuitry 483 for connection with BATTERY 2. The output from the battery charger chip 1483 is connected to the battery B2 through a fuse PTC2 in the form of a current limiter. The output of the converter 482, as shown in FIG. 16, is also supplied through a charge controller circuit 484, as shown in FIG. 17, which functions to charge battery B1 at battery receptacle circuit 483, through fuse PTC1 which functions as a current limiter. The charge controller circuit 484 may include a charge controller chip U7, chip LTC4088 manufactured by Linear Technologies. The charge controller chip U7 also provides an output voltage from voltage supplied at input power jack J1 to a converter 485 in the form of a converter chip U12, as shown in FIG. 18. The converter U12 may be in the form of a chip LM3674MF manufactured by National Semiconductor. The charge control chip U7 also functions to enable voltage to be supplied to the converter U12 from voltage at battery B1 in the event that power is disconnected from or not supplied at jack J1. The converter U12 functions to convert the output from the charge controller circuit 484 whether derived from battery B1 or from input jack J1 to a useable voltage, such as VDD. The nominal output voltage from the charge controller chip 484 may be 3.6 to 4.2 volts. The converter U12 functions to convert such input voltage to a DC output of 3.2 volts or VDD. The 3.2 volt output from the converter 485 is supplied to the power on switching circuitry 488 so that the voltage VDD may be power on or off relative to the operational circuitry of the base unit 400.

The power on switching circuitry 488 is connected with an on or on/off switch such as a push button S1 on line PSBT1. When the user pushes the center push button S1 on line PSBT1, the gate of switching transistor Q10 draws LOW turning transistor Q10 ON to supply the 3.2 voltage from the output of the converter 485 as an output, voltage VDD at pin 2 to the microprocessor chip 455. When voltage VDD is supplied to the microprocessor chip, such chip is powered ON and a HIGH power signal is supplied as an output on the POWER line to the gate of switch latch transistor Q11. When the HIGH power signal is supplied to transistor Q11, transistor Q11 is turned ON thereby latching the gate of Q10 LOW thereby holding the power to the microprocessor ON even when the center push button S1 is thereafter released. The output VDD from transistor Q10 at pin 2 is also supplied as an input to voltage regulator circuitry 600, as shown in FIG. 19, so that the voltage regulator 600 may convert the input voltage VDD of 3.2 volts to a useable output voltage VCC of 2.5 volts. The convertor 600 may include converter chip U4, chip TPS79425DGN, to convert the input voltage supplied at pin 8 to a desired output voltage at pin 1. In more detail, when the base unit 400 is OFF and S1 is depressed to turn the unit ON, the depression of S1 causes the gate 1 of Q10 switching transistor to go LOW which turns Q10 ON which in turn causes the output of voltage VDD. The output of voltage VDD at pin 2 of Q10 turns the controller 455 ON and causes the regulator 600 to output voltage VCC to turn the transceiver 470 ON. The controller 455 then outputs a HIGH signal on the POWER line which is supplied to the gate 1 of latching transistor Q11 to turn Q11 ON which in turn causes the gate 1 of switching transistor Q10 to be latched LOW which in turn causes Q10 to remain latched ON even after S1 is released. Once the base unit 400 is on, the unit may optionally be turned off using S1. By depressing S1 when the unit is ON for a selected time period necessary to effect turn off, such as 5 seconds, the microprocessor 455 will detect the depression of the switch for the selected time interval and will cause the POWER line to drop LOW. When the microprocessor causes the POWER line to go LOW, Q11 will be turned OFF. Q11 will stay OFF and when the push button switch S1 is thereafter released the gate of Q10 will go HIGH causing Q10 to turn OFF. As a result, Q10 will no longer be latched ON and voltage VDD will not be output at pin 2 of Q10 at the power switch 488 and consequently voltage VCC will not be produced at the output of the converter 600.

Diagnostic voltage monitoring circuitry 500, as shown in FIG. 20, may also be provided to enable the controller circuitry 450 to monitor selected voltage levels in the circuitry. For example, diagnostic voltage monitoring circuitry 500 may be provided to monitor a voltage level, such as 5.6 volts, used to supply adequate voltage to voltage chargers 484 and 1483 for battery 1 and for battery 2 respectively. Turning to the diagnostic voltage monitoring circuit 500, as shown in FIG. 20, such circuitry is optionally provided and connected at the input of the charge controller circuitry 484, as shown in FIG. 17, and optionally to the charger circuit 1483, as shown in FIG. 17, to monitor the input voltage to the charge controller circuitry 484 and optionally to the charger circuit 1483. The diagnostic voltage monitoring circuitry 500 includes a ZENER diode D7 the functions to clamp the voltage to prevent excess voltage from being supplied to the charge controller circuitry 484 and the charger circuit 1483. The ZENER diode clamps the voltage at 6.8 volts. The nominal voltage of about 5.6 volts that is supplied to the charge controller circuit 484 and to the charger circuit 1483 is monitored by the microprocessor 455 along line PF1. A switching transistor Q12 is connected intermediate the microprocessor 455 and the ZENER diode D7 in order to prevent back powering of the microprocessor. More specifically, if VDD from the power switch circuitry is ON, switching transistor Q13 is turned ON which in turn causes Q12 to go ON to allow PF1 to measure the voltage supplied to the charge controller circuitry 484 and optionally to and the charger unit 1483. If VDD goes low or off, for example, when the unit is turned off, then Q13 will go OFF which in turn causes Q12 to go OFF and thereby prevents back flow to the input/output pins of the microprocessor.

Similarly, diagnostic voltage monitoring circuitry 502, as shown in FIG. 21, may be provided for monitoring a voltage level of VDD, such as 3.2 volts. The diagnostic voltage circuit 502, as shown in FIG. 21, may optionally be provided to monitor voltage VDD at line PFO to the processor. More specifically, line PFO may be connected to a voltage divider supplied by voltage VDD so the PFO monitors a fractional portion, such as ½, of VDD. The components of the circuitry for the animal transceiver unit 100 are set forth in Table A as follows:

TABLE A

| | |
|---|---|
| PCB | PCB, Wifi Receiver |
| C21 | Capacitor, 150 uF, 16 V, Tant "D" Low ESR 150 mohms |
| C6, C13 | Capacitor, .01 uF 0603 10% X7R 50 v |

TABLE A-continued

| | |
|---|---|
| C5, 8, 14, 15, 16, 17, 25, 28, 29 | Capacitor, .1 uF 50 v ceramic Y5V 0603 −20%, +80% |
| C11, C12 | Capacitor, 22 pF ceramic 50 v NPO 5% 0603 |
| C23 | Capacitor, 1.0 uF ceramic 25 v X5S 0603 20% |
| C24 | Capacitor, ceramic 1000 pF 50 v COG 0603 5% |
| C7, C20 | Capacitor, 22 uF 6.3 v Tant "B" 10% |
| C18 | Capacitor, 220 uF 4 v Tant "B" 20% |
| C26 | Capacitor, 4.7 uF 6.3 v X5R 0603 10% |
| R26-29, R31, R50, R53 | Resistor, 2M 1/10 w 1% 0603 |
| R3, R33, R56, R60, R61 | Resistor, 14.3K 1/10 w 1% 0603 |
| R19, 21, 22, 35, 36, 39-43, 45-47, 51, 52, 54, 55, 57 | Resistor, 1.1M, 1% 0603 |
| R58, R59 | Resistor, 100K 5% 0603 |
| R1 | Resistor, 10K 1/10 w 1% 0603 |
| R49 | Resistor, 100 ohm 1/10 w 5% 0603 |
| R2 | Resistor, 4.99 ohm 1/10 w 1% 0603 |
| R18, R30, R44 | Resistor, 33K, 1%, 0603 |
| R20 | Resistor, 3.9K, 1%, 0603 |
| R25 | Resistor, 221K 1/10 w 1% 0603 |
| R24 | Resistor, 412K 1/10 w 1% 0603 |
| R23 | Resistor, 620K 1/10 w 1% 0603 |
| R48 | Resistor, 10M 1/10 w 1% 0603 |
| U5 | nanoPAN_5375 |
| U1 | IC, Atmega644PV-10AU AVR MCU 64K 10 MHZ 3 V 44TQFP |
| U4 | IC, Regulator, LDO RF High-Enable 250-mA MSOP8, TPS79425DGN |
| U8, U9 | IC AMP, LMP2231 SOT-23-5 |
| U6 | IC CONV DC/DC STEP UP 8MSOP LT1316 MS8 |
| Q2-Q5, Q7 | MOSFET N-CHAN 20 V 1.7 A SOT-23, FDN335N |
| U7 | Transistor, IRF7459 20 V 12 A SO8 Single N Mosfet, SO-8 |
| Q6 | MOSFET P-CHAN 12 V 2.6 A SOT-23, (SSOT-3) FDN306P |
| A1 | Antenna Chip 2.3 GHz WiMAX (Antenova) |
| L1 | Inductor, 10 nH, 650 mA, 0603, 5% |
| L2 | Inductor, 1.5 nH 0402 +/− 0.2 nH |
| L3 | Inductor, 100 uH .54 A SMD, CDRH6D28 |
| TF1 | Transformer, HI Rel |
| D3 | Diode, Switch, 1N4148, 100 v, 150 mA, SOD123 |
| D1 | Diode, Schottky 20 v 0.5 A SOD-123 MBR0520L |
| Y2 | CRYSTAL 7.3728 MHZ 20 PF SMD |
| VS1 | Mini sense horizontal vibration-sensor |
| P1 | Speaker, PC mount, TDB03PNL, 2 v −5 v, 12 mm |
| B- | CFR Battery contact |

The components of the circuitry for the base transceiver unit 400 are set forth in Table B as follows:

TABLE B

| | |
|---|---|
| PCB | PCB, Wifi Transmitter |
| C23, C24 | Capacitor, 1000 pF 25 V 10% X7R 0603 |
| C6, C13, C29 | Capacitor, .01 uF 0603 10% X7R 50 v |
| C1-5, C8, C14-17, 19, 21, 37, 40, 41, 43 | Capacitor, .1 uF 50 v ceramic Y5V 0603 −20%, +80% |
| C7 | Capacitor, 2.2 uF ceramic 10 v X5R 0603 10% |
| C18, C38, C39 | Capacitor, 100 pF microwave 150 v COG 0605 5% |
| C11 C12, | Capacitor, 22 pF ceramic 50 v NPO 0603 5% |
| C20 | Capacitor, .47 uF ceramic 10 v X5R 0603 10% |
| C25 | Capacitor, 470 uF 35 v Alum elect radial, 20% LS.197 10 × 16 mm |
| C26, C28 | Capacitor, 1.0 uF ceramic 25 v X5S |

TABLE B-continued

| | |
|---|---|
| C27 | Capacitor, 22 uF 16 v 20% Tant "D" 7343-31 |
| C30 | Capacitor, 47 uF 25 v 20% Tant "D" 7343-31 |
| C42 | Capacitor, 10 uF 25 v 20% Tant "B" 3528 |
| C44, C45 | Capacitor, 33 pF ceramic 50 v COG 0603 5% |
| C46 | Capacitor 10 uF ceramics 10 V X5R 20% 1206 |
| R29, R47, R48, R54 | Resistor, 2M 1% 0603 |
| R44, R45, R66 | Resistor, 1K, 5% 0603 |
| R2, R3, R33, R77 | Resistor, 14.3K 1/10 w 1% 0603 |
| R35, 36, 39-42, 51, 59, 62, 68, 76 | Resistor, 1.1Meg, 0603 1% |
| R53, R55, 63, 64, 69-75, 78-82, 84 | Resistor, 100K 5% 0603 |
| R43, R50 | Resistor, 360 ohm, 1% 0805 |
| R1, R58 | Resistor, 10K 1/10 w 1% 0603 |
| R4 | Resistor, 4.7K 1/10 w 5% 0603 |
| R57 | Resistor, 33K, 1/10 w 1%, 0603 |
| R30 | Resistor, 2.94K 1/10 w 5% 0603 |
| R61, R65 | Resistor, 4.02K 1/10 w 1% 0603 |
| R60 | Resistor, 8.2 1/10 w 1% 0603 |
| R56, R85 | Resistor, 560K, 1/10 w 1%, 0603 |
| U5 | nanoPAN_5375 |
| U1 | IC, Atmega128, AVR MCU 128K 8 MHZ 3 V 64TQFP |
| U2, U3 | IC, TXRX DUAL 4BIT SN74AVC4T245, 16-TSSOP |
| U4 | IC, Regulator, LDO RF High-Enable 250-mA MSOP8, TPS79425DGN |
| U6 | IC SW REG STEP-DN 1.4 MHZ SOT23-6, LT1616 |
| U9 | IC SWITCH SPDT 6-MINIMOLD, UPG2214TK |
| U10 | IC dual inverter SC-70-6, SN74LVC2G04 |
| U7 | IC Battery charger 14-DFN, LTC4088EDE#TRPBF |
| U11 | IC Battery charger LI-ION 800 MA DFN6, STBC08PMR |
| U12 | IC conv DC/DC 600 mA ADJV SOT23-5, LM3674MF-ADJ/NOPB |
| Q5, Q6, Q7, Q11, Q13 | MOSFET N-CHAN 20 V 1.7 A SOT-23, FDN335N (SI2302DS T/R 0) |
| Q10, Q12 | MOSFET P-CHAN 12 V 2.6 A SOT-23, (SSOT-3) FDN306P |
| L1 | Inductor, 10 nH, 650 mA, 0603, 5% |
| L2, L3 | Inductor, 1.8 uH, 650 mA, 3 mm × 3 mm, 20% |

Operation of the Base Transceiver Unit

Figure 25A:
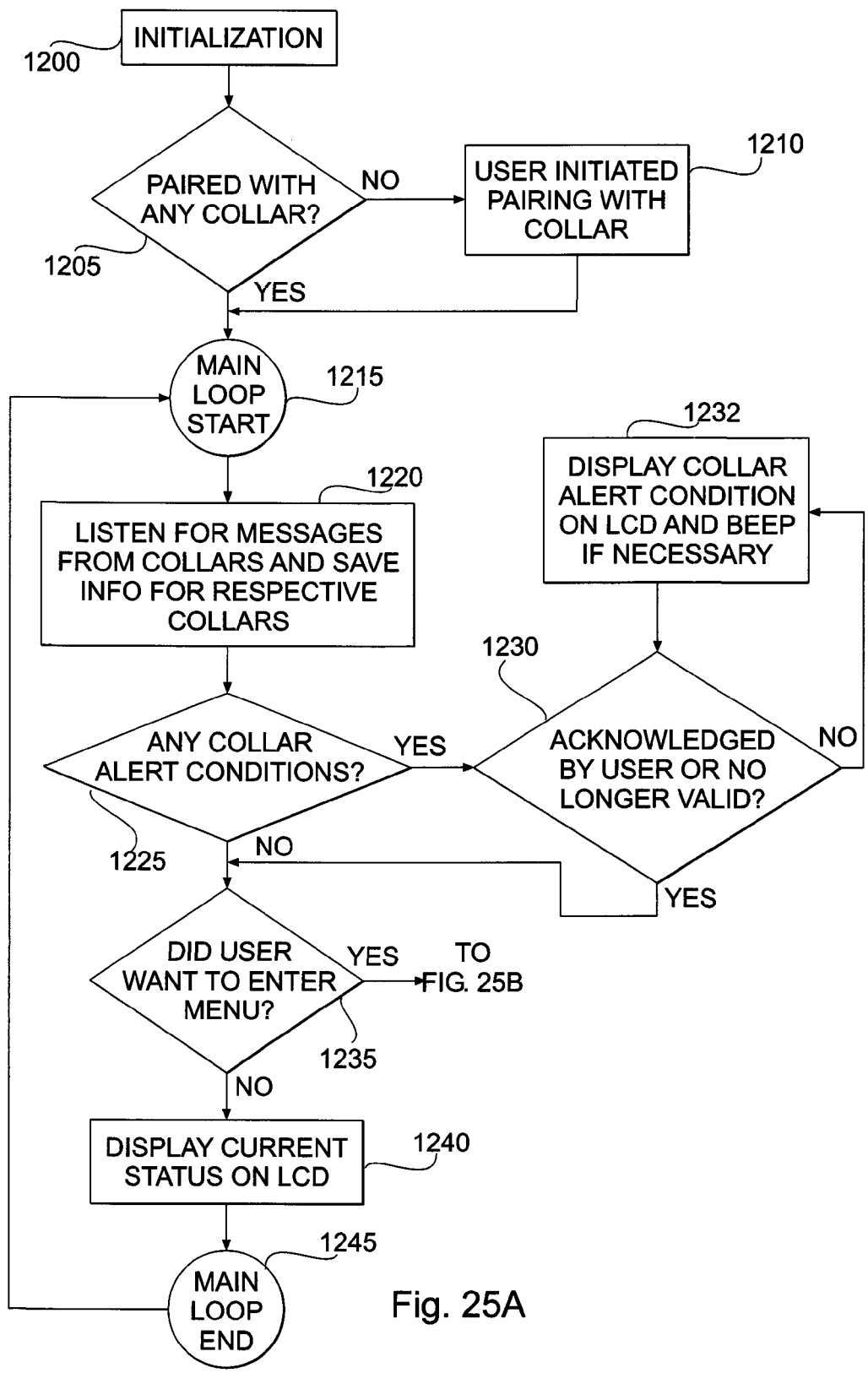
FIGS. 25A and 25B are diagrammatic flow charts of methods and processes for the base transceiver unit of FIGS. 1 and 2.

Referring to FIG. 25A, there is illustrated a flowchart diagramming selected methods of using the base transceiver unit 400. The base transceiver 400 is first initialized at step 1200. During the process of initialization, the system may engage in self-diagnostics to determine that all hardware and software are functioning properly. The base 400 may display diagnostic information of some format to the user on LCD screen 492. At step 1200, the base 400 also retrieves any saved state information (such as previously saved pairings with collar transceiver 100, maximum distance boundaries, etc) from memory. At step 1205, the system determines if it is currently paired with a collar transceiver 100. If the base 400 is not paired with any collars, it may prompt the user to pair with one or more collar transceivers 100 at step 1210. If a collar is already paired with base 400, the user may choose to pair another collar 100 with base 400. If the user does attempt a pairing between the base 400 and a collar 100, the base 400 will display to the user whether or not the pairing is successful. During the process of pairing a collar transceiver 100 to the base 400, the base 400 guides the user through the process of battery installation whereby base 400 and collar transceiver 100 then automatically pair. Once one or more collar transceivers 100 are paired with the base 400, the base 400 begins the main programming loop at step 1215. Once the main programming loop of the base 400 is initialized, the base begins to listen for collar information at step 1220. The information sent from the collars may include collar identification information, distance between collar transceiver 100 and the base 400, the battery level of collar 100, whether or not collar 100 is out of bounds, the currently set correctional stimulus level of collar 100, or any other information collected by collar 100. This information may be stored in memory by base 400. Next, at step 1225, base 400 determines if collar 100 is transmitting an alert condition signal. These conditions may include any information from the collar 100 that may be of interest to the user, such as a low battery level, a lost signal between base 400 and collar 100, or a collar located outside of the previously determined maximum distance. It may also be a condition detected by the base, such as a loss of communication between base 400 and collar 100. If an alert condition is detected by base 400, the base 400 then determines at step 1230 if the alert condition has been either acknowledged by the user or if the condition is no longer valid (such as if the collar has moved back within the predetermined boundary). If the alert condition has not been acknowledged by the user (such as through a key press on base 400) and the condition is still valid, the base 400 displays the collar alert condition on the LCD at step 1232. The base 400 may also alert the user through blinking lights, an audible alarm, or through some other method. If no alert conditions are detected or the alert condition has either been acknowledged by the user or the condition is no longer valid, the base transceiver advances to step 1235 and detects whether or not the user is attempting to access a system menu. This may be indicated by the user through a keypress. If the user is not attempting to access the menu, the base 400 displays current status on the LCD 492 at step 1240. The current status information may include the collar 100's name, battery level, distance from base, current boundary distance, base battery levels, or other indicators. The base station then advances to step 1245 and restarts the main programming loop at step 1215. If base 400 determines that the user is attempting to access a menu at step 1235, then at step 1250 the base begins to process further keypresses.

Figure 25B:
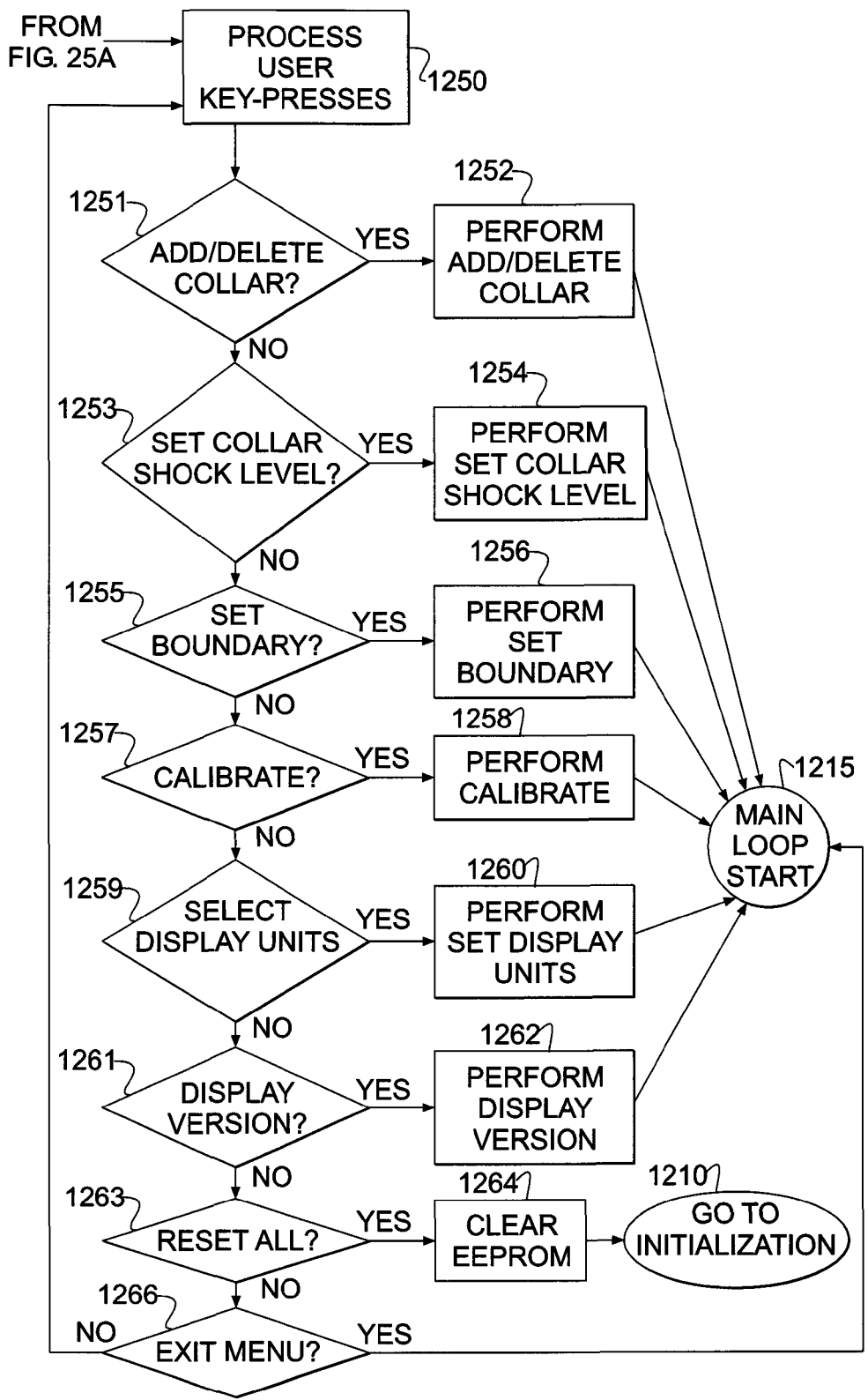

Beginning at step 1251, as shown in FIG. 25B, the base 400 determines which of a list of potential actions the user is attempting to perform. First, at step 1251, the base 400 determines if the user is attempting to add or delete a collar 100 from the system's pairing list. If this is the case, the base 400 moves to step 1252 and prompts the user to add or delete a collar 100. If the user adds or deletes a collar 100, the base 400 then performs the appropriate steps to add or delete the collar 100 and then moves back to step 1215 and begins the main loop again. If the user cancels the act of adding or deleting a collar 100, or the user is not attempting to add or delete a collar, the base 400 moves to step 1253, where it determines if the user is attempting to set the shock level of the collar. If this is the case, base 400 moves to step 1254 and prompts the user to set the shock level for the collar 100 Once this is complete, base 400 reinitializes the main loop at step 1215. If the user cancels the attempt to set the shock level of the collar, or the user is not trying to do so, the base 400 moves on to step 1255, where it determines if the user is attempting to set a boundary level. If the user is attempting to do so, it advances to step 1256 and prompts the user to set a boundary. The base 400 then saves the new boundary information and reinitializes the main loop at step 1215. If the user is not attempting to set a boundary, or the user cancels a confirmed attempt to set the boundary, the system moves to step 1257. Here, the base 400 attempts to determine if the user wishes to calibrate. If the user does wish to calibrate, the system advances to step 1258 and performs calibration routines. This may include actions on the user's part, such as moving the collar at predetermined distances in order for the base 400 to properly calibrate its distance calculation and communications settings. From here, the system reinitializes the main loop at step 1215. If the user is not attempting to calibrate the system, or the user cancels the calibration step, base 400 advances to step 1259 to determine if the user wishes to change the measurement units display (for example, from meters to feet). If this is the case, base 400 advances to step 1260 and changes the settings of the display units, optionally displaying a list of choices on LCD 492. Once this is complete, the system advances to step 1215. If the user cancels the units selection process, or the user is not attempting to change display units of the base, it advances to step 1261, where the base 400 determines if the user is attempting to display the version of the software. If this is the case, step 1262 activates the display of the version of the software on LCD screen 492 and reinitializes the main loop 1215. If this is not the case, the system determines if the user is attempting to reset the device at step 1263. If the user is attempting to reset the device, the system may prompt the user to confirm the resetting of the device. Upon confirmation (if applicable), the system clears the EEPROM of the system at step 1264, erasing all stored settings and data except for the default calibration data. From here, the system returns to step 1210, initialization. If no at step 1263, or if the user cancels, base 400 calculates if it should exit the menu at step 1266. This may be indicated by a user's keypress. If so, base 400 restarts the main loop at step 1215. If this is not the case, the system returns to step 1250, again waiting for user input.

Operation of the Animal Transceiver Unit

Figure 26A:
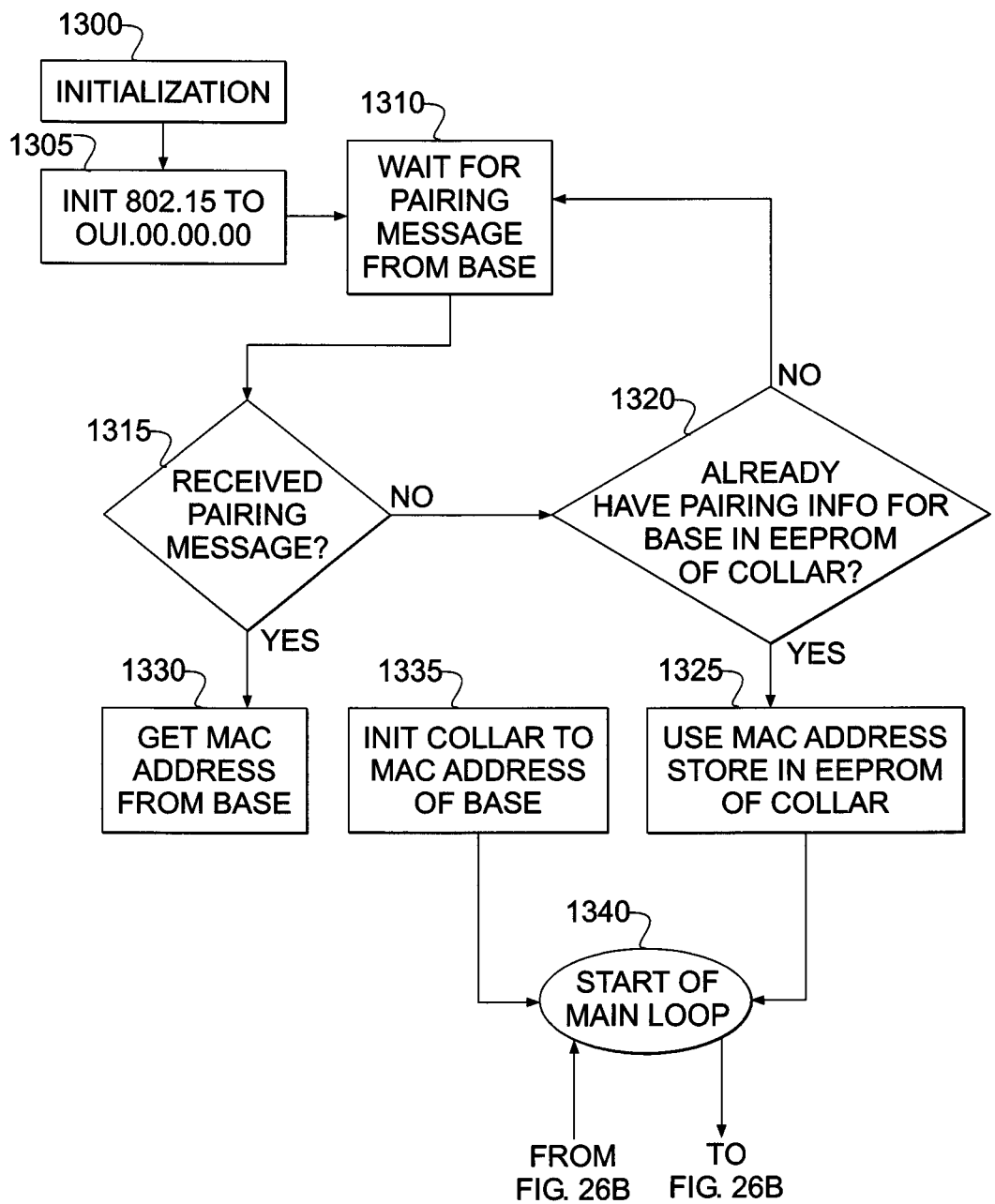
FIGS. 26A and 26B are diagrammatic flow charts of methods and processes for the collar transceiver unit of FIG. 1.

Referring to FIG. 26A there is illustrated a flowchart diagramming the selected methods of using the base transceiver unit 400. Collar 100 begins the initialization process at step 1300. Here, the collar retrieves any previously saved states (which may include stored pairings, shock levels, or maximum boundary distances). Once collar 100 has initialized, the collar moves to step 1305 to initialize a communication standard. After step 1305, the collar moves to step 1310, where it begins the process of waiting for a pairing message from base 400. During this process, the collar 100 checks to determine if it has received a pairing message from base 400 at step 1315. This is to allow the collar to be re-paired with base 400. If the collar does not receive a pairing message from base 400, it checks to determine if pairing information for the collar and a base 400 has already been stored in EEPROM at step 1320. If there is no pairing information already in EEPROM, the collar restarts the loop at step 1310. If the collar does have pairing information, which may consist of a MAC address of the base station, stored in EEPROM, it retrieves this information at step 1325. Collar 100 then advances to step 1335, where it initializes the collar to the MAC address of the base 400, triggering the start of the main loop at step 1340. If the collar does receive a pairing message at step 1315, the system instead retrieves the MAC address of base 400 at step 1330, and advances to step 1335 to begin the main loop at step 1340.

Figure 26B:
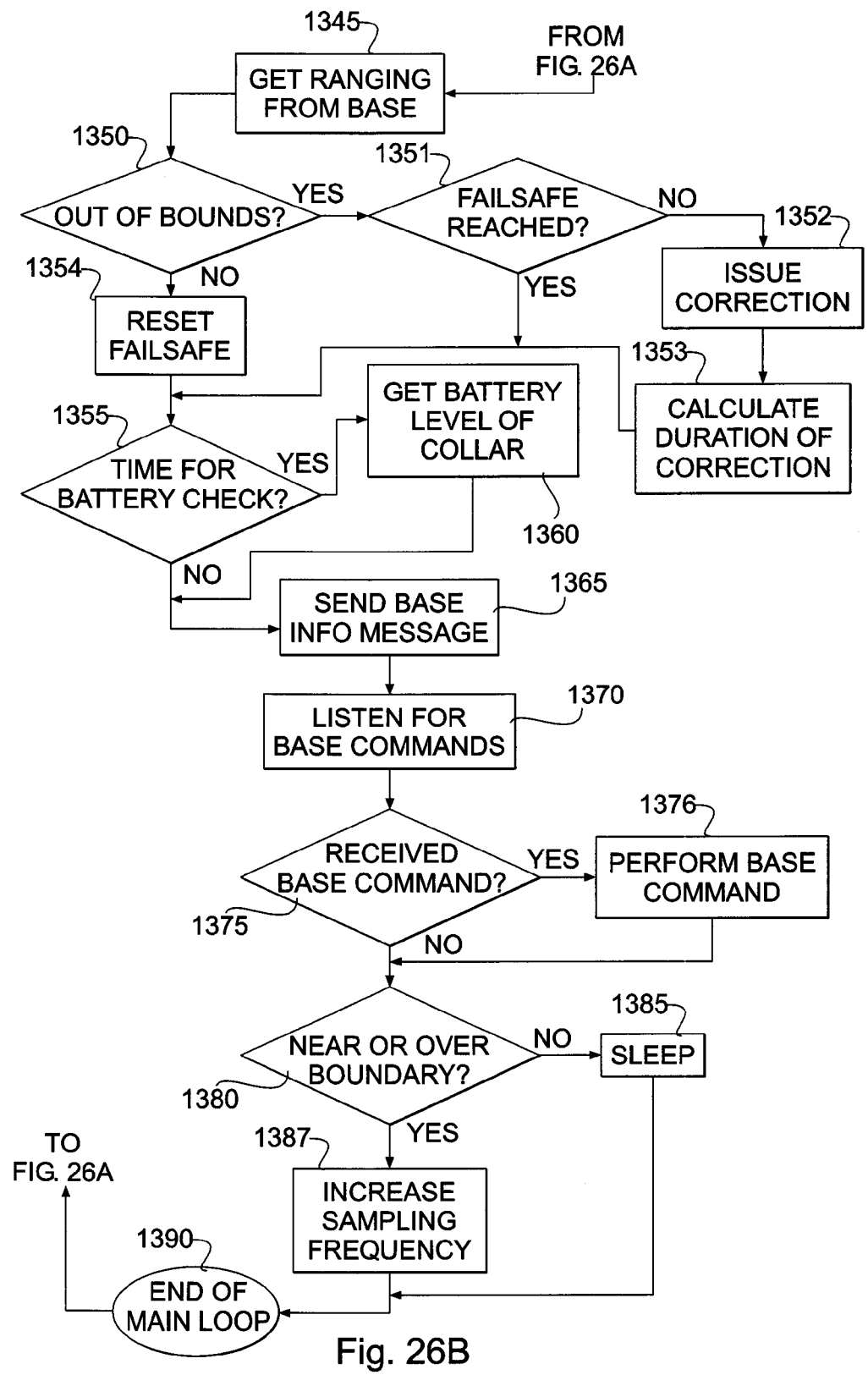

From the main loop at step 1340, the collar goes through a series of steps, as shown in FIG. 26B, to determine various states of the collar, such as the distance of the collar from the base or whether the base 400 is issuing an instruction. At step 1345, the collar retrieves ranging information from the base 400 which includes the distance between the base and the collar. The ranging information is then used at step 1350 to determine whether the collar 100 has exceeded the set boundary distance. If the collar determines that it is outside of the previously set boundary, the collar then advances to step 1351 to determine whether or not a failsafe has been reached. This failsafe may include the number of correctional stimuli delivered, level of stimulation, or time elapsed outside of the predetermined boundary. If the failsafe has not been reached, the collar 100 advances to step 1352 where a correctional stimulus is issued. Once the stimulus is activated, a clock is used to time the milliseconds of correction at step 1353. The duration of the stimulus may vary depending on variables such as user settings, level of correctional stimulus, or number of stimuli previously issued. If the failsafe has been reached at step 1351, the collar continues to step 1355. If the collar is determined to be within the predetermined distance to base 400 at step 1350, the collar resets the failsafe variable at step 1354 and advances to step 1355. At step 1355, the collar 100 determines whether or not to check the battery levels on the device. This may occur as a result of a user-determined interval or automatically. If a battery check is necessary, the collar advances to step 1360, where it gets the battery level of the collar. This information, along with other information such as distance between the collar 100 and base 400, whether the collar is out of bounds, and the shock level of the collar, is then sent to base 400 at step 1365. The collar may also determine whether it is moving (such as due to an animal's movement), and adjust transmission time accordingly. At step 1370, the collar listens for any commands that may be sent to it from base 400. These commands may include a reset command, a boundary adjustment command, a shock level adjustment command, or a decoupling command. At step 1375, the collar 100 determines whether or not it has received a base command. If the collar 100 receives a command, it advances to step 1376 and performs the command. The collar 100 may send a confirmation or error message to base 400 to indicate if the command was successfully completed. Once the command is completed, an error message has been sent, or the collar 100 determines that it is not receiving a command from base 400, the collar advances to step 1380, where it checks whether or not the collar is approaching or has exceeded the boundary distance between the base and the collar. If neither condition is true, the collar then goes into a sleep mode at step 1385, powering down the radio transceiver for a predetermined interval and lengthening the time between communications with base 400. If collar 100 determines that it is approaching or has exceeded the boundary distance, it increases the sampling frequency at step 1387 to increase the precision of the ranging feature. Next, the collar re-initializes the main loop at step 1390 and starts again at step 1340.

What is claimed is:

1. A system for monitoring and restraining the movement of an animal, comprising:
   a. a base for transmitting and receiving signals;
   b. a collar for placement at the animal in signal communication with the base and configured to transmit and receive signals to and from the base at a selected frequency of communication;
   c. a controller in communication with at least one of the base and collar configured to provide a reference control distance from the base and a system range limit from the base, the controller having circuitry configured to calculate the distance between the collar and the base using time of flight transmissions between the collar and the base, and wherein at least one of the collar and the base is configured to increase the frequency of communication if the animal approaches at least one of the reference control distance and system range limit; and d. a stimulus circuit configured to provide a stimulus to the animal in response to a control signal produced by one of the base and collar;

wherein at least one of the base and collar are configured to transmit the control signal to the stimulus circuit when the distance between the collar and the base meet a criteria for control.

2. The system of claim 1, wherein the collar comprises a collar transceiver unit configured to transmit signals to and/or receive signals from the base.

3. The system of claim 1, wherein the base comprises a base transceiver unit configured to transmit signals to and/or receive signals from the collar.

4. The system of claim 3, wherein the base comprises a base controller circuit.

5. The system of claim 4, wherein the base includes a user input to enable a user to input information to the base transceiver unit under the control of the base controller circuit.

6. The system of claim 5, wherein the base controller circuit functions to enable the reference control distance to be input to the base transceiver unit at the user input.

7. The system of claim 4, wherein the base transceiver unit and the base controller circuit are electronically connected relative to one another, and wherein the base transceiver unit operates at a digital signal level that is different from the digital signal level of operation of the base controller circuit, and wherein further the base transceiver unit includes a converter for converting the digital signal level of operation of the base transceiver circuit relative to the digital signal level of operation of the base controller circuit to enable signal communication between the base transceiver unit and the base controller circuit.

8. The system of claim 1, wherein the signals comprise wireless radio frequency signals.

9. The system of claim 1, wherein the base has circuitry configured to adjustably set the reference control distance or the system range limit from the base.

10. The system of claim 1, wherein at least one of the collar and the base is configured to increase the frequency of communication if the animal exceeds at least one of the reference control distance and system range limit.

11. The system of claim 1, wherein the stimulus comprises an electric shock, an audible alarm, or a combination thereof.

12. The system of claim 1, wherein the stimulus circuitry is adjustable to produce selected levels of stimulus to the animal.

13. The system of claim 1, wherein the reference control distance is less than the system range limit.

14. The system of claim 1, wherein the base comprises a base output for providing output information to a user, and wherein the base output provides output information reflecting an indicia of the relative distance between the base and the collar to the user.

15. The system of claim 14, wherein the base output includes a display for providing a visual display of output information to the user.

16. The system of claim 14, wherein the base output includes an audible output for providing an audible indication if the collar approaches or exceeds at least one of the reference control distance and system range limit.

17. The system of claim 1, wherein the base transceiver unit includes base power supply circuitry for supplying power to the base transceiver unit.

18. The system of claim 17, wherein the base power supply circuitry includes a battery receptacle for batteries to supply power to the base transceiver unit to enable the base transceiver to be portably movable by a user.

19. The system of claim 17, wherein the base power supply circuitry includes a jack for connection with an external source of power.

* * * * *